US 8,406,547 B2

(12) United States Patent
Monobe et al.

(10) Patent No.: US 8,406,547 B2
(45) Date of Patent: *Mar. 26, 2013

(54) VISUAL PROCESSING DEVICE, VISUAL PROCESSING METHOD, PROGRAM, DISPLAY DEVICE, AND INTEGRATED CIRCUIT

(75) Inventors: Yusuke Monobe, Kyoto (JP); Haruo Yamashita, Osaka (JP); Takeshi Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/005,797

(22) Filed: Jan. 13, 2011

(65) Prior Publication Data

US 2011/0109765 A1 May 12, 2011

Related U.S. Application Data

(63) Continuation of application No. 12/297,403, filed as application No. PCT/JP2007/056448 on Mar. 27, 2007, now Pat. No. 7,894,684.

(30) Foreign Application Priority Data

Apr. 19, 2006 (JP) .................... 2006-115176

(51) Int. Cl.
*G06K 9/40* (2006.01)
*H04N 9/64* (2006.01)
*H04N 9/00* (2006.01)

(52) U.S. Cl. ........ 382/254; 382/264; 382/266; 348/622; 348/625

(58) Field of Classification Search .................. 382/165, 382/167, 190, 199, 219, 220, 250, 251–252, 382/255–256, 260–266; 348/607, 610, 615, 348/622, 625, 627; 358/3.26, 3.27, 532, 358/537, 540, 463, 464
See application file for complete search history.

(56) References Cited

U.S. PATENT DOCUMENTS

| 4,667,304 A | 5/1987 | Hier et al. |
| 5,012,333 A | 4/1991 | Lee et al. |

(Continued)

FOREIGN PATENT DOCUMENTS

| EP | 0 377 386 | 8/1995 |
| EP | 1 404 120 | 3/2004 |

(Continued)

OTHER PUBLICATIONS

International Search Report issued Jun. 5, 2007 in International (PCT) Application No. PCT/JP2007/056448.

(Continued)

*Primary Examiner* — Andrae S Allison
(74) *Attorney, Agent, or Firm* — Wenderoth, Lind & Ponack, L.L.P.

(57) ABSTRACT

A visual processing device inhibits artifacts, even when a special image is input. The visual processing device includes a spatial processing portion extracting surrounding image information from an input image signal, and a special image detection portion outputting a special image effect adjustment signal according to a degree of a statistical bias of the input image signal. The visual processing device also includes a continuous changing portion outputting an effect adjustment signal in which the special image effect adjustment signal is continuously changed between frames, an effect adjustment portion outputting a synthesized signal in which the effect of the visual processing differs depending on the effect adjustment signal, and a visual processing portion outputting a processed signal obtained by visually processing the image signal based on the image signal and the synthesized signal.

8 Claims, 19 Drawing Sheets

U.S. PATENT DOCUMENTS

| | | | |
|---|---|---|---|
| 5,038,388 | A | 8/1991 | Song |
| 5,050,223 | A | 9/1991 | Sumi |
| 5,454,044 | A | 9/1995 | Nakajima |
| 5,485,534 | A | 1/1996 | Takemoto |
| 5,555,031 | A | 9/1996 | Van Rooij |
| 5,602,942 | A | 2/1997 | Takemoto |
| 5,880,767 | A | 3/1999 | Liu |
| 6,055,340 | A | 4/2000 | Nagao |
| 6,169,823 | B1 | 1/2001 | Takeo et al. |
| 6,285,798 | B1* | 9/2001 | Lee .................. 382/260 |
| 6,323,855 | B1 | 11/2001 | Hamilton, Jr. et al. |
| 6,373,992 | B1 | 4/2002 | Nagao |
| 6,611,627 | B1 | 8/2003 | LaRossa et al. |
| 6,628,842 | B1* | 9/2003 | Nagao .................. 382/266 |
| 6,633,683 | B1 | 10/2003 | Dinh |
| 6,731,400 | B1 | 5/2004 | Nakamura et al. |
| 6,735,330 | B1* | 5/2004 | Van Metter et al. .......... 382/132 |
| 6,847,377 | B2 | 1/2005 | Kitahara et al. |
| 6,965,416 | B2* | 11/2005 | Tsuchiya et al. ............. 348/606 |
| 7,127,122 | B2 | 10/2006 | Ogata et al. |
| 7,130,483 | B2 | 10/2006 | Kim |
| 7,136,538 | B2 | 11/2006 | Kitagawa |
| 7,248,743 | B2 | 7/2007 | Murakami |
| 7,283,680 | B2 | 10/2007 | Cheng |
| 7,333,673 | B2 | 2/2008 | Wang |
| 7,426,300 | B2 | 9/2008 | Ohkawa |
| 7,433,536 | B2* | 10/2008 | Kim .................. 382/266 |
| 7,602,447 | B2* | 10/2009 | Arici et al. .................. 348/687 |
| 7,689,055 | B2 | 3/2010 | Zhang et al. |
| 7,881,549 | B2 | 2/2011 | Yamashita et al. |
| 7,881,550 | B2 | 2/2011 | Ito et al. |
| 7,894,684 | B2* | 2/2011 | Monobe et al. ............... 382/254 |
| 7,903,898 | B2 | 3/2011 | Ito et al. |
| 2002/0047911 | A1* | 4/2002 | Tsuchiya et al. ............. 348/252 |
| 2002/0181024 | A1 | 12/2002 | Morimoto et al. |
| 2004/0051789 | A1 | 3/2004 | Horita |
| 2004/0051794 | A1 | 3/2004 | Horita |
| 2004/0066980 | A1 | 4/2004 | Gindele |
| 2004/0096103 | A1 | 5/2004 | Gallagher et al. |
| 2004/0175054 | A1* | 9/2004 | Ogata et al. .................. 382/274 |
| 2004/0202377 | A1 | 10/2004 | Murakami |
| 2004/0246537 | A1 | 12/2004 | Ohyama et al. |
| 2005/0013484 | A1 | 1/2005 | Ohkawa |
| 2005/0058365 | A1 | 3/2005 | Wang |
| 2005/0089239 | A1 | 4/2005 | Brajovic |
| 2005/0094890 | A1* | 5/2005 | Wang .................. 382/266 |
| 2005/0104974 | A1 | 5/2005 | Watanabe et al. |
| 2005/0207629 | A1 | 9/2005 | Toyoda |
| 2007/0188623 | A1 | 8/2007 | Yamashita et al. |
| 2010/0014773 | A1* | 1/2010 | Ito et al. .................. 382/266 |

FOREIGN PATENT DOCUMENTS

| | | |
|---|---|---|
| EP | 1 480 166 | 11/2004 |
| EP | 1 515 537 | 3/2005 |
| GB | 2 170 373 | 7/1986 |
| JP | 62-143567 | 6/1987 |
| JP | 63-177662 | 7/1988 |
| JP | 63-182785 | 7/1988 |
| JP | 02-226375 | 9/1990 |
| JP | 3-48980 | 3/1991 |
| JP | 4-152788 | 5/1992 |
| JP | 6-46295 | 2/1994 |
| JP | 7-135667 | 5/1995 |
| JP | 7-177530 | 7/1995 |
| JP | 10-191054 | 7/1998 |
| JP | 10-208034 | 8/1998 |
| JP | 2000-149014 | 5/2000 |
| JP | 2001-5960 | 1/2001 |
| JP | 2001-275015 | 10/2001 |
| JP | 2002-83294 | 3/2002 |
| JP | 2002-281313 | 9/2002 |
| JP | 2002-314814 | 10/2002 |
| JP | 2003-008935 | 1/2003 |
| JP | 2003-60913 | 2/2003 |
| JP | 2003-110956 | 4/2003 |
| JP | 2003-296728 | 10/2003 |
| JP | 2003-309763 | 10/2003 |
| JP | 2003-333331 | 11/2003 |
| JP | 2003-337942 | 11/2003 |
| JP | 2004-38842 | 2/2004 |
| JP | 2004-78652 | 3/2004 |
| JP | 2004-102903 | 4/2004 |
| JP | 2004-310475 | 11/2004 |
| JP | 2004-312387 | 11/2004 |
| JP | 2004-320632 | 11/2004 |
| JP | 2005-39324 | 2/2005 |
| JP | 2005-108208 | 4/2005 |
| JP | 2005-130484 | 5/2005 |
| JP | 2005-269145 | 9/2005 |
| JP | 2005-295131 | 10/2005 |
| JP | 2006-24176 | 1/2006 |
| JP | 4157592 | 10/2008 |
| JP | 4437150 | 3/2010 |
| WO | 2005/004040 | 1/2005 |
| WO | 2005/027043 | 3/2005 |
| WO | 2005/038713 | 4/2005 |

OTHER PUBLICATIONS

Hier, Richard G., et al., "Image Content Based Improvements to Locally Adaptive Video Enhancement," 1994 IEEE ICIP-94, vol. 3, pp. 621-624.

Saito et al., "Automatic Production of Hand-Painted Images," The Institute of Television Engineers of Japan, vol. 50, No. 10, pp. 1528-1535, Oct. 20, 1996.

Extended European Search Report issued Apr. 9, 2010 in International (PCT) Application No. PCT/JP2006/320074.

International Search Report issued Nov. 21, 2006 in International (PCT) Application No. PCT/JP2006/320074.

Scognamiglio et al., "A Rational Unsharp Masking Method for TV Applications," Oct. 24-28, 1999, IEEE Image Processing, 1999. ICIP 99. Proceedings, pp. 247-251, vol. 4.

Carrato et al., "A Gradient Directed Unsharp Masking Algorithm for Synchrotron Radiation Angiography," 1989, Electrotechnical Conference, 1989. Proceedings, INSPEC.

Ramponi et al, "Nonlinear Unsharp Masking Methods for Image Contrast Enhancement," Journal of Electronic Imaging 5(3), pp. 353-366 (Jul. 1996).

Cheikh et al., "Directional-Rational Approach for Color Image Enhancement," 2000, Circuits and Systems, 2000, Proceedings. ISCAS 2000 Geneva. The 2000 IEEE International Symposium.

Kim et al., "Optimal Unsharp Mask for Image Sharpening and Noise Removal," Journal of Electronic Imaging, Apr.-Jun. 2005, pp. 1-13.

Extended European Search Report dated Feb. 22, 2012 in corresponding European Application No. 11153448.3.

Supplementary European Search Report mailed Apr. 20, 2012 in corresponding European Application No. 07 73 9886.

Ogata et al., "Dynamic Range Compression Based on Illumination Compensation", *IEEE Transactions on Consumer Electronics*, vol. 47, No. 3, Aug. 1, 2001, pp. 548-558.

Narendra et al., "Real-Time Adaptive Contrast Enhancement", *IEEE Transactions on Pattern Analysis and Machine Intelligence*, vol. PAMI-03, No. 6, Nov. 1, 1981, pp. 655-661.

Office Action mailed May 24, 2012 in corresponding U.S. Appl. No. 13/017,380.

\* cited by examiner

VISUAL PROCESSING DEVICE, VISUAL PROCESSING METHOD, PROGRAM, DISPLAY DEVICE, AND INTEGRATED CIRCUIT

This application is a continuation of U.S. application Ser. No. 12/297,403, filed Oct. 16, 2008, now U.S. Pat. No. 7,894,684 which is a national stage application of International Application No. PCT/JP2007/056448, filed Mar. 27, 2007.

BACKGROUND OF THE INVENTION

1. Field of Invention

The present invention relates to visual processing devices, visual processing methods, programs, display devices, and integrated circuits, and in particular relates to visual processing devices, visual processing methods, and programs for performing adjustment so as to change the effect of visual processing of an image.

2. Description of the Related Art

Conventionally, image processing devices that employ tone processing, and image processing devices that employ spatial processing, as processing methods for improving the quality of the image signal of an original image have been known.

Tone processing is processing in which a lookup table (hereinafter, abbreviated as "LUT") is used to effect pixel value conversion for each target pixel, regardless of the pixels surrounding that target pixel, and is also known as gamma correction. For example, to enhance the contrast, pixel value conversion is performed using a LUT for assigning a wide range of tone to frequently appearing tone levels in the original image. Some examples of tone processing in which a LUT is employed include tone processing in which a single LUT is selected and used for an entire original image, and tone processing in which a LUT is selected and used for each of a plural number of image regions obtained by partitioning the original image.

Spatial processing is technology that involves use of the value of a target pixel for filter application and the values of the pixels around that pixel in order to transform the value of the target pixel. The image signal that is obtained through spatial processing is used to perform contrast enhancement of the original image (for example, see Patent Citation 1).

Patent Citation 1: U.S. Pat. No. 4,667,304.

BRIEF SUMMARY OF THE INVENTION

On the other hand, one example of processing, for improving the image quality, that resembles human vision is visual processing, in which the value of a target pixel is converted based on the contrast between the value of the target pixel and the values of the pixels in the surrounding region. In such visual processing, to further enhance the processing effect, the brightness information is extracted from a wide region around the position of the target pixel.

Thus, with visual processing in which the value of a target pixel and the value of a given pixel in the surrounding region are used to determine a value for the target pixel, the value of the target pixel is changed based on the value of the given pixel in the surrounding region. In particular, if visual processing is performed on, for example, images with few edge regions, images with few gradations, images in which there is little difference in the luminance between adjacent pixels and many continuous analogous values occur, and images that have been partitioned into a plurality of blocks in which few blocks include high-frequency components (hereinafter, such images will be referred to as "special images"), then there is a large change in the luminance in regions that are near edges.

However, when a large change in luminance occurs in a flat region of a special image which consists of few tone levels and has large flat regions, a shadow-like border occurs (hereinafter, referred to as "artifacts") in the region adjacent to the edge and results in an unnatural image.

The present invention was arrived at resolve the above-mentioned issues, and it is an object of the present invention to provide a visual processing device, a visual processing method, a program, a display device, and an integrated circuit that (i) are capable of suppressing artifacts, even if a special image has been input, and (ii) with a simple configuration can change the strength of the visual processing of the image.

A first aspect of the invention is a visual processing device that is provided with a surrounding image information extraction portion, a visual processing portion, a special image detection portion, and an effect adjustment portion. The surrounding image information extraction portion is for extracting surrounding image information of an image signal that can form a single image. The visual processing portion outputs a processed signal that is obtained by visually processing an image signal based on the image signal and the surrounding image information. The special image detection portion is for detecting a statistical bias in a predetermined region within the single image that is formed by the image signal, calculating a special image degree that indicates a degree to which the single image is a special image based on the statistical bias that is detected, and outputting an effect adjustment signal based on the special image degree that is calculated. The effect adjustment portion controls the effect of the visual processing to the image signal that forms the single image, in accordance with the effect adjustment signal.

With this visual processing device, the special image detection portion detects statistical biases in a predetermined region that is included within a single image that is formed by the image signal, calculates the special image degree, which indicates the degree to which the single image is a special image based on the statistical bias that is detected, and outputs an effect adjustment signal based on the special image degree that has been calculated. The effect adjustment portion then controls the visual processing portion so as to set the effect of visual processing on the image signal that forms the single image, in accordance with the effect adjustment signal. Consequently, it is possible to calculate a single special image degree for a single image, and based on that special image degree, to perform visual processing that is ideal for that single image.

Thus, the visual processing effect can be maintained if a normal image that is not a special image is input and artifacts can be inhibited if a special image is input, and, with a simple configuration, the strength of the visual processing of the image can be changed.

Here, a "single image" refers to a two-dimensional image that is displayed on the display device, and if this is a still image, then it refers to a two-dimensional image that makes up a display screen that is displayed on the display device, whereas if it is a moving picture, then it refers to a two-dimensional image that is displayed on the display device based on an image (video) signal for a single frame or an image (video) signal for a single field. It should be noted that the image signal that forms a single image may also be inclusive of a synchronization signal or the like for display on the display device.

Further, the "predetermined region that is included within a single image" refers to an image region having a predetermined size that is included within a single image, and for example, this corresponds to an image region that encompasses 80% of the area from the center of the entire display screen when the single image is displayed on the display device, or an image region without black sections (if the aspect ratio of the display device and the aspect ratio of the image that is displayed are different, then the black section is displayed on the display screen of the display device, and for example, is a black section that is displayed on the left and right ends of the display screen when an image (video) with a 4:3 aspect ratio is displayed on a display device that has a display screen with a 16:9 aspect ratio (this corresponds to the pedestal level video signal of a television signal in the NTSC format, for example)). It should be noted that the "predetermined region that is included within a single image" obviously also is inclusive of the entire display screen region (the entire image region of a single image) when the single image is displayed on the display device.

Here, the visual processing (spatial visual processing) refers to processing for performing tone correction on a target pixel (region) using the tone properties, which change according to the brightness of the area around the target pixel (region). For example, in a case where the tone level of a target pixel in the input signal is a small tone level (for example, an 8-bit tone level of "50"), and the area around the target pixel is dark (for example, 8-bit tone levels of "20"), then tone correction is performed such that the tone level of the target pixel becomes a large tone level (for example, an 8-bit tone level of "150"). Conversely, in a case where the tone level of a target pixel in the input signal is a small tone level (for example, an 8-bit tone level of "50"), and the area around the target pixel is bright (for example, 8-bit tone levels of "100"), then tone correction is performed such that the tone level of the target pixel becomes a small tone level (for example, an 8-bit tone level of "30"). Such processing is only one example of spatial visual processing.

A second aspect of the invention is similar to the first aspect of the invention, except that the special image detection portion detects the statistical bias based on a ratio of regions in which the gradation is judged to be in changes to the predetermined region that is included within the single image formed by the image signal, or a ratio of regions in which the gradation is judged to be in constant to the predetermined region. Thus, additionally, it is possible to detect a statistical bias of the single image from the proportion of regions in which the gradation changes, or from the proportion of regions in which the gradation does not change, in the image of the image signal.

A third aspect of the invention is similar to the second aspect of the invention, except that the special image detection portion increases the degree to which the ratio of regions in which the gradation is judged to be in change to the total number of regions in the image is low, or when the ratio of the number of regions in which the gradation is judged to be in constant to the total number of regions in the image is high.

Thus, additionally it is possible to detect the degree to which an image is a special image, and it is possible to output an effect adjustment signal that is suited for processing the special image.

A fourth aspect of the invention is similar to the second aspect of the invention, except that, the special image detection portion, in a case where a gradation change region percentage, which is a percentage of regions in which the gradation changes, is smaller than a first value, sets the signal level of the effect adjustment signal to a value that is smaller than a first effect adjustment signal level threshold, and in a case where the gradation change region percentage is equal to or greater than the first value and is smaller than a second value (which is greater than the first value), sets the signal level of the effect adjustment signal to a larger value the larger the value of the gradation change region percentage. The special image detection portion, in a case where the gradation change region percentage is equal to or greater than the second value, sets the gradation change region percentage to a larger value than a second effect adjustment signal level threshold, which is a larger value than the first effect adjustment signal level threshold.

For example, when the effect adjustment signal takes on a value from 0 to 1, where the effect of visual processing by the effect adjustment portion is a maximum when the effect adjustment signal is 1, and the effect of visual processing by the effect adjustment portion is a minimum (including instances where there is no effect) when the effect adjustment signal is 0, then if the gradation change region percentage is smaller than the first value, the effect adjustment signal level is fixed at 0, whereas if the gradation change region percentage is equal to or greater than the first value but smaller than the second value (which is greater than the first value), the effect adjustment signal level is set such that it monotonically increases with respect to the gradation change region percentage (it is set to a value between 0 and 1), and if the gradation change region percentage is equal to or greater than the second value, the effect adjustment signal level is fixed at 1.

Thus, if the image signal forms a single image that is a special image, then the effect of visual processing can be set to a minimum or to no effect. If the image signal forms a single image that is a natural image, then the effect of visual processing can be set to a maximum. Further, a suitable visual processing effect can be obtained if the image signal forms a single image that is an intermediate image between a special image and a natural image.

Consequently, this visual processing device allows an ideal visual processing effect to be achieved regardless of the type of image that is input.

A fifth aspect of the invention is similar to the third aspect or the fourth aspect of the invention, except that the special image detection portion detects the ratio of regions in which the gradation is judged to be in change by detecting an edge component in the regions of the image.

Thus, additionally it is possible to detect the ratio of regions in which the gradation changes from the edge component of the image.

An sixth aspect of the invention is similar to the third aspect or the fourth aspect of the invention, except that the special image detection portion detects the ratio of regions in which the gradation does not change by detecting a degree of flatness in the image.

Thus, it is also possible to detect the ratio of regions in which the gradation does not change from the degree of flatness in the image.

It should be noted that the degree of flatness of the single image that is formed by the image signal can be found by detecting the tone level shift of the pixels that make up that image.

A seventh aspect of the invention is similar to the sixth aspect of the invention, except that the special image detection portion detects the degree of flatness based on the total of number of continuous pixels analogous to each other in pixel value (tone level) or the number of tone levels.

Thus, additionally it is possible to detect the degree of flatness from the number of tone levels or the continuous length of analogous pixels in the image.

The eighth aspect of the invention is similar to the fifth aspect of the invention, except that the special image detection portion detects a statistical bias based on an edge pixel number, which is a number of pixels that make up an edge in a predetermined region within the single image that is formed by the image signal.

Thus, for example, the statistical bias can be detected simply by counting the number of edge pixels in a predetermined region within the single image, and thus the number of computations can be reduced and the processing speed of the visual processing device can be increased. It is also possible to, for example, compare the number NN of edge pixels in the predetermined region within the single image against a predetermined threshold Tth, and if it is greater than the threshold Tth, to detect the statistical bias with a continuous function f(NN) in which the number NN of edge pixels is a variable.

A ninth aspect of the invention is similar to the fifth aspect of the invention, except that the special image detection portion is provided with an edge detection portion for detecting edge pixels in a predetermined region included in the single image that is formed by the image signal, an edge pixel number calculation portion for calculating the number of edge pixels, and a first effect adjustment signal generation portion for outputting the effect adjustment signal in accordance with the number of edge pixels that is calculated by the edge pixel number calculation portion.

With this visual processing device, the number of edge pixels detected by the edge detection portion can be calculated by the edge pixel number calculation portion. Then, the first effect adjustment signal generation portion can output an effect adjustment signal that corresponds to the edge pixel number that is calculated by the edge pixel number calculation portion. Thus, the computational burden can be reduced, and the processing speed of the visual processing device can be increased. For example, it is also possible for the first effect adjustment signal generation portion to compare the edge pixel number NN that is calculated by the edge pixel number calculation portion against a predetermined threshold Tth, and if it is greater than the threshold Tth, to output an effect adjustment signal based on a continuous function f(NN) in which the edge pixel number NN is a variable, and by doing so detect the statistical bias.

A tenth aspect of the invention is similar to the fifth aspect of the invention, except that the special image detection portion detects the statistical bias based on an edge pixel ratio, which is a percentage of the number of edge pixels out of the total number of pixels that make up the predetermined region within the single image that is formed by the image signal.

Thus, it is also possible to detect a special image from the edges within the image, and to create an effect adjustment signal that corresponds to the percentage of edge pixels in the special image. It should be noted that here "edge pixel number" refers to the number of pixels that make up an edge in the single image that is formed by the image signal.

A eleventh aspect of the invention is similar to the fifth aspect of the invention, except that the special image detection portion has an edge detection portion that detects edge amount for each pixel in an image formed by the image signal, an edge density calculation portion that detects edge pixels whose edge amount is equal to or greater than a predetermined value and calculates a ratio of the number of edge pixels to the total number of pixels in the image signal, and a first effect adjustment signal generation portion that outputs the effect adjustment signal according to the edge pixel ratio.

Thus, additionally it is possible to detect a special image from the edges in the image, and it is possible to create an effect adjustment signal that corresponds to the bias of the proportion of edge pixels in the special image.

A twelfth aspect of the invention is similar to the tenth or eleventh aspects of the invention, except that the special image detection portion outputs the output value of the effect adjustment signal as a value that is equal to or greater than a first threshold, in a case where the edge pixel ratio is 20 or more percent.

If the edge pixel ratio is 20 percent or more, then it can be determined that the image that is formed by the image signal has a high probability of being a natural image, and thus in this case the visual processing device can set the edge adjustment signal that is output to a value that is equal to or greater than a first threshold, so that the effect adjustment signal is adjusted so that a visual effect for a natural image is achieved, and by doing so it is possible to achieve appropriate visual processing. It should be noted that a natural image does not refers to images that are created by someone purposefully or artificially (an image (with few tone levels) such as a test pattern, in which the tone levels of the pixels that form the image are over represented), and instead refers to images with many tone levels (number of tone levels) among the pixels that form the image (wide range of tone levels), such as an image of scenery (an image in which scenery is captured by a camera, for example). The first threshold preferably is a relatively high enough value that visual processing for a natural image is executed based on the effect adjustment signal if the edge pixel ratio is 20 percent or more. The effect adjustment signal takes on a value from 0 to 1, and in a case where the effect adjustment signal is 1 then the effect of visual processing by the effect adjustment portion is a maximum, and if the effect adjustment signal is 0, then the first threshold can be set to 0.8, for example.

A thirteenth aspect of the invention is similar to the third or fourth aspects of the invention, except that the special image detection portion detects a statistical bias based on a number of high frequency blocks, which are blocks that include high frequency components, that are present in the predetermined region within the single image that is formed by the image signal.

Thus, it is also possible to create an effect adjustment signal based on the number of high frequency blocks in the image. For example, it is also possible to compare the block number KK in a predetermined region that is included in the single image against a predetermined threshold Kth, and if it is greater than the threshold Kth, to detect the statistical bias based on a continuous function f(KK) in which the block number KK is a variable. It should be noted that here, a "block" is made of a plurality of pixels.

A fourteenth aspect of the invention is similar to the third or fourth aspects of the invention, except that the special image detection portion has a high frequency block detection portion for detecting high frequency blocks, which are blocks that include high frequency components, that are present in the predetermined region within the single image that is formed by the image signal, a high frequency block number calculation portion for calculating the number of high frequency blocks that are in the predetermined region, and a third effect adjustment signal generation portion for outputting the effect adjustment signal according to the high frequency block number that is calculated by the high frequency block number calculation portion.

With this visual processing device, the high frequency blocks that are detected by the high frequency block detection portion can be detected, and it is possible to output an effect adjustment signal that corresponds to the number of high frequency blocks that is calculated by the high frequency block number calculation portion. Thus, the computational burden can be reduced, and the processing speed of the visual processing device can be increased. For example, the third effect adjustment signal generation portion can compare the high frequency block number KK that is calculated by the high frequency block number calculation portion against a predetermined threshold Kth, and if it is greater than the threshold Kth, then the third effect adjustment signal generation portion can output an effect adjustment signal based on a continuous function f(KK) in which the high frequency block number KK is a variable, in this way detecting the statistical bias.

A fifteenth aspect of the invention is similar to the third or fourth aspects of the invention, except that the special image detection portion detects a statistical bias based on a high frequency block ratio, which is a percentage of high frequency blocks of the total number of blocks, in the predetermined region within the single image that is formed by the image signal.

Thus, additionally, it is possible to detect a special image by detecting high-frequency blocks within the image, and it is possible to create an effect adjustment signal that corresponds to the bias of the proportion of high-frequency blocks in the special image.

A sixteenth aspect of the invention is similar to the third or the fourth aspects of the invention, except that the special image detection portion has a high frequency block detection portion for detecting high frequency blocks, which include high frequency components, from an image signal that has been partitioned into a plurality of blocks, a high frequency block density detection portion for detecting the percentage of high frequency blocks among a plurality of blocks, and a fourth effect adjustment signal generation portion for outputting the effect adjustment signal according to this percentage.

Thus, it is further possible to detect special images by detecting the high frequency blocks in the image, and to create an effect adjustment signal that corresponds to shifting in the proportion of high frequency blocks in the special image.

A seventeenth aspect of the invention is similar to the seventh aspect of the invention, except that the special image detection portion has a classifier (a frequency detection portion) that classifies the pixel in the image formed by the image signal into a class based on a tone level of the pixel and counts the number of the pixels belonging to each class, a frequency determination portion (determination portion) that compares the number of pixels belonging to each class with a predetermined threshold value to detect a class with the number of pixels larger than the predetermined threshold value, a tone level number detection portion that counts the number of classes detected by the determination portion, and a fifth effect adjustment signal generation portion that outputs the effect adjustment signal according to the number of the counted classes.

Thus, additionally, it is possible to detect a special image from the number of tone levels in the image, and it is possible to create an effect adjustment signal that corresponds to the bias in the number of tone levels in the special image.

An eighteenth aspect of the invention is similar to the seventh aspect of the invention, except that the special image detection portion has an analogous luminance detection portion for detecting analogous pixels, in which the luminance difference between adjacent pixels is not more than a predetermined threshold, from the image signal, a continuous length detection portion for detecting a continuous length over which the analogous pixels are continuous, a mean continuous length calculation portion for calculating a mean continuous length by finding the mean of a plurality of continuous lengths that have been detected by the continuous length detection portion, and a sixth effect adjustment signal generation portion for outputting an effect adjustment signal in accordance with the mean continuous length.

Thus, additionally, it is possible to detect a special image from the mean continuous length of analogous pixels in the image, and it is possible to create an effect adjustment signal that corresponds to the bias of the mean continuous length in the special image.

A nineteenth aspect of the invention is similar to any one of the first through eighteenth aspects of the invention, except that the effect adjustment portion outputs a first synthesized signal that is synthesized by changing the ratio of the image signal and the surrounding image information according to the effect adjustment signal, and wherein the visual processing portion visually processes the image signal based on the first synthesized signal and the image signal.

Thus, additionally, it is possible for the visual processing portion to select different tone conversion processing based on the first synthesized signal, so that it can differ the effect of the visual processing A twentieth aspect of the invention is similar to any one of the first through eighteenth aspects of the invention, except that the effect adjustment portion outputs a second synthesized signal that is synthesized by changing the ratio of the image signal and the processed signal according to the effect adjustment signal.

Thus, additionally, it is possible to perform the output changing the ratio of the image signal and the processed signal according to the effect adjustment signal, and this allows the visual processing effect to be differed.

A twenty-first aspect of the invention is similar to any one of the first through eighteenth aspects of the invention, except that the visual processing portion has a two-dimensional lookup table, and performs the visual processing based on characteristic data that have been set in the two-dimensional lookup table, and in which the effect adjustment portion sets, in the visual processing portion, characteristic data that are synthesized changing the proportion of a plurality of characteristic data with different visual processing effects according to the effect adjustment signal.

Thus, additionally, it is possible to perform visual processing using characteristic data that are synthesized by changing the ratio of a plurality of characteristic data with different visual processing effects in accordance with the effect adjustment signal, and this allows the effect of visual processing to be differed.

A twenty-second aspect of the invention is similar to any one of the first through twenty-first aspects of the invention, except that the special image detection portion inputs a reduced image, in which the image signal has been reduced, and detects special images, which have the statistical bias, from the reduced image and outputs the effect adjustment signal based on the statistical bias.

Thus, additionally, the impact of noise when detecting a special image is suppressed. It is also possible to reduce the number of computations of the processing.

A twenty-third aspect of the invention is similar to any one of the first through twenty-second aspects of the invention, except that the special image detection portion detects the statistical bias from a frame image one or more frame images prior when the image signal is a frame image, or from a field image one or more field images prior when the image signal is a field image.

Thus, additionally, it is possible to detect a special image from the frame one or more frame images prior, and it is possible to use an effect adjustment signal that corresponds to the bias of the information of the special image from the head of the frames. It is also possible to detect a special image from the field one or more fields prior, and it is possible to use an effect adjustment signal that corresponds to the bias of the information of the special image from the head of the fields.

A twenty-fourth aspect of the invention is similar to the twenty-third aspect of the invention, but further includes a continuous changing portion for continuously changing the effect adjustment signal. The continuous changing portion continuously changes the effect adjustment signal between frames when the effect adjustment signal is output in frame units, or between fields when the effect adjustment signal is output in field units.

Thus, additionally, it is possible to suppress sudden changes in the effect adjustment signal between frames, and thereby suppress flickering of the image between frames. It is also possible to suppress sudden changes in the effect adjustment signal between fields, and thereby suppress flickering of the image between fields.

A twenty-fifth aspect of the invention is a display device that is provided with a data reception portion that receives image data that have been transmitted or broadcast, a decoding portion that decodes the image data that have been received into video data, the visual processing device according to any one of the first through twenty-fourth aspects of the invention for visually processing the decoded video data and outputting an output signal, and a display portion that performs a display of the output signal that has been visually processed by the visual processing device.

With this configuration, it is possible to change the strength of visual processing in real time through brightness adjustment of the image and display this with a display device. It should be noted that in addition to a display device, it is also possible to achieve an image-capturing device and a portable information terminal device that are provided with the visual processing device.

The image-capturing device can have a configuration in which it is provided with an image-capturing portion that performs an image capture of an image, and a visual processing device that receives the image that has been captured by the image-capturing portion as an input signal and performs visual processing.

With this configuration, with an image-capturing device as well it is possible to obtain the same effect as the visual processing devices.

The portable information device can have a configuration in which it is provided with a data reception portion that receives image data that have been communicated or broadcast, a visual processing device that visually processes the image data that have been received and outputs an output signal, and display means for performing a display of the output signal that has been visually processed.

With this configuration, with a portable information device as well it is possible to obtain the same effect as the visual processing devices.

The portable information device can have a configuration in which it is provided with an image-capturing portion that performs an image capture of an image, a visual processing device that receives the image that has been captured by the image-capturing portion as an input signal and performs visual processing and outputs an output signal, and a data transmission portion for transmitting the output signal that has been visually processed.

With this configuration, with a portable information device it is possible to obtain the same effect as the visual processing devices.

A twenty-sixth aspect of the invention is a visual processing method that is provided with a surrounding image information extraction step, a visual processing step, a special image detection step, and an effect adjustment step. The surrounding image information extraction step is for extracting surrounding image information of an image signal that can form a single image. The visual processing step is for visually processing the image signal based on the image signal and the surrounding image information. The special image detection step is for detecting a statistical bias in a predetermined region that is included within a single image that is formed by the image signal, and based on the statistical bias that is detected, calculating a special image degree that indicates a degree to which the single image is a special image, and outputting an effect adjustment signal based on the special image degree that has been calculated. The effect adjustment step is for setting an effect of visual processing with respect to the image signal that forms the single image, in accordance with the effect adjustment signal.

Thus, a visual processing effect can be maintained if a normal image that is not a special image is input and artifacts can be inhibited if a special image is input, and, with a simple configuration, the strength of the visual processing of the image can be changed.

With this method, it is possible to maintain the visual processing effect in a case where a normal image that is not a special image is input, and in a case where a special image is input it is possible to achieve an appropriate visual processing effect in which artifacts are inhibited.

A twenty-seventh aspect of the invention is a program for causing a computer to execute a surrounding image information extraction step, a visual processing step, a special image detection step, and an effect adjustment step. The surrounding image information extraction step is for extracting surrounding image information of an image signal that can form a single image. The visual processing step is for visually processing the image signal based on the image signal and the surrounding image information. The special image detection step is for detecting a statistical bias in a predetermined region that is included within the single image that is formed by the image signal, calculating a special image degree that indicates a degree to which the single image is a special image based on the statistical bias that is detected, and outputting an effect adjustment signal based on the special image degree that is calculated. The effect adjustment step is for setting an effect of the visual processing with respect to the image signal that forms the single image, in accordance with the effect adjustment signal.

With this program, it is possible to maintain the visual processing effect in a case where a normal image that is not a special image is input, and in a case where a special image is input it is possible to achieve an appropriate visual processing effect in which artifacts are inhibited.

A twenty-eighth aspect of the invention is an integrated circuit that is provided with a surrounding image information extraction portion, a visual processing portion, a special image detection portion, and an effect adjustment portion. The surrounding image information extraction portion is for extracting surrounding image information of an image signal that can form a single image. The visual processing portion is for outputting a processed signal that is obtained by visually processing the image signal based on the image signal and the surrounding image information. The special image detection portion is for detecting a statistical bias in a predetermined region that is included within the single image that is formed by the image signal, calculating a special image degree that indicates a degree to which the single image is a special image based on the statistical bias that is detected, and outputting the special image degree that is calculated as an effect adjustment signal. The effect adjustment portion is for controlling the visual processing portion so as to set an effect of visual processing with respect to the image signal that forms the single image in accordance with the effect adjustment signal.

With this integrated circuit, it is possible to maintain the visual processing effect in a case where a normal image that is not a special image is input, and in a case where a special image is input it is possible to achieve an appropriate visual processing effect in which artifacts are inhibited.

With the invention, it is possible to achieve a visual processing device, a display device, a visual processing method, a program, and an integrated circuit that can inhibit artifacts even in a case where an image that has sharp edge regions or a special image has been input.

DETAILED DESCRIPTION OF THE INVENTION

Below, visual processing devices according to embodiments of the invention are described with reference to the drawings.

First Embodiment

In general, natural images have a large number of tone levels, and by performing visual processing on a natural image it is possible to obtain a sharp image in which the local contrast, for instance, has been enhanced. On the other hand, special images have a statistical bias, such as either an extremely low proportion of regions in which the gradation changes in the image of the image signal, or an extremely large proportion of regions in which the gradation does not change in the image of the image signal. In such special images, there are many flat regions in the image. For this reason, artifacts easily stand out when visual processing is executed on a special image with steep edges.

This artifact (which may also be referred to as a "Halo") is readily apparent (humans perceive it as unnatural) in sections of the image with minor changes or little texture, for example, when the image is displayed on a display device. This is even more the case with images that have geometric patterns that from experience humans know to be uniform in brightness or concentration, where even minute swells in the brightness of the image are readily perceived as unnatural (the image is readily felt to be unnatural). Weakening the visual processing in order to suppress these artifacts weakens the processing for natural images as well and results in images that are not sharp.

Thus, by suppressing artifacts only for special images, it is possible to achieve an excellent visual processing effect for natural images.

The visual processing device in the first embodiment of the invention detects special images that have a statistical bias from the image signal, creates an effect adjustment signal based on the degree of the statistical bias, and then performs adjustment so as to differ (change) the effect of visual processing in accordance with the effect adjustment signal that has been created.

Here, the visual processing is processing for giving characteristics that are close to human vision, and is processing for determining the value of an output signal based on the contrast between the value of a target pixel of an image signal that has been input and the values of pixels around that target pixel. The visual processing may be adopted in backlight correction, knee processing, DR compression, color processing, and brightness adjustment (including tone processing and contrast adjustment).

In this embodiment of the invention, the luminance component Y or the brightness component L of a YCbCr color space, a YUV color space, a Lab color space, a Luv color space, a YIQ color space, or a YPbPr color space is defined as the luminance signal. Hereinafter, the luminance signal is described as the image signal.

Figure 1:
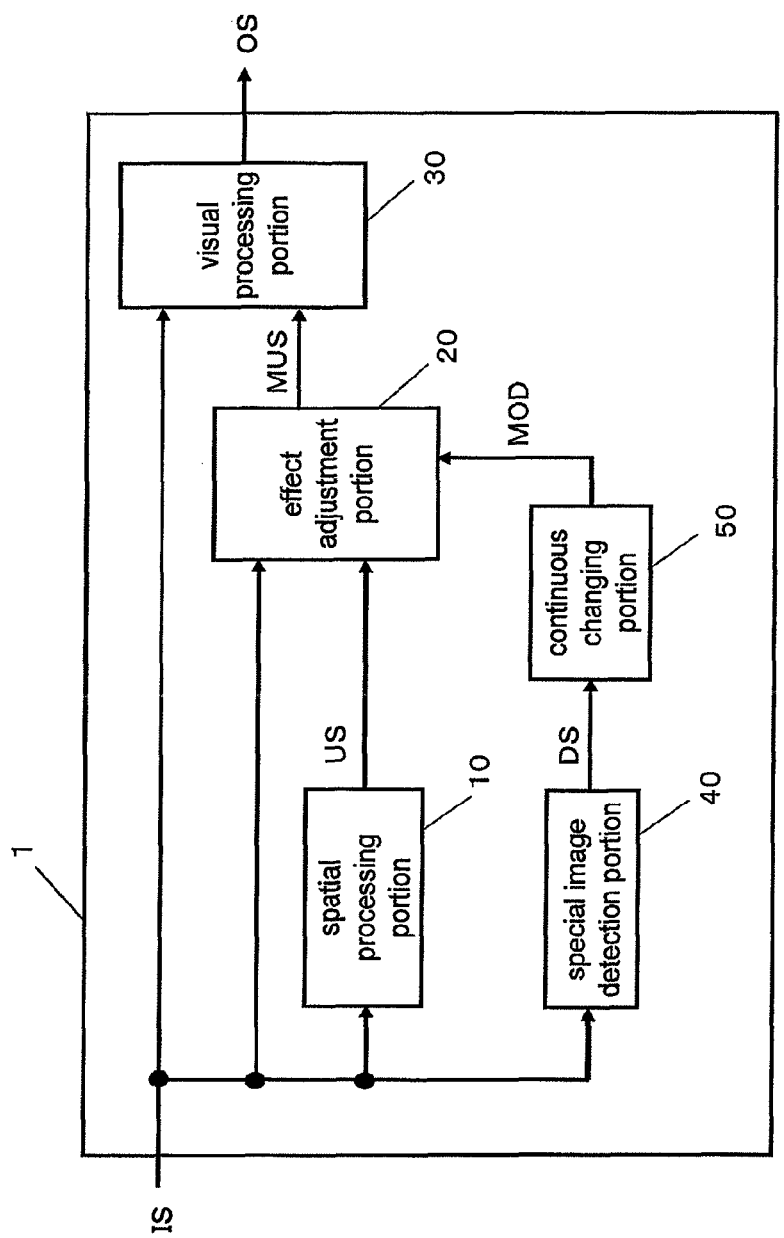
FIG. 1 is a block diagram of a visual processing device according to the first embodiment of the invention.

The visual processing device of the first embodiment of the invention is described using FIGS. 1 through 8. FIG. 1 is a block diagram that shows the configuration of a visual processing device 1 of the first embodiment of the invention.

In FIG. 1, the visual processing device 1 of the first embodiment of the invention is provided with a spatial processing portion 10 for extracting surrounding image information (unsharp signal) US from the image signal IS that has been input, a special image detection portion 40 that detects special images that have a statistical bias from the image signal IS and output a special image effect adjustment signal DS for differing the effect of visual processing based on the degree of the statistical bias, a continuous changing portion 50 for outputting an effect adjustment signal MOD that is obtained by continuously changing the special image effect adjustment signal DS between frames, an effect adjustment portion 20 for outputting a synthesized signal MUS that is synthesized changing the proportion of the image signal IS and the surrounding image information US according to the effect adjustment signal MOD, and a visual processing portion 30 for outputting a processed signal OS that is obtained by visually processing the image signal IS according to the synthesized signal MUS from the effect adjustment portion 20.

With this configuration, the special image detection portion 40 can output a special image effect adjustment signal DS that corresponds to the degree of the information bias held by the special image. The effect adjustment portion 20 can create a synthesized signal MUS for differing the effect of visual processing by the visual processing portion 30, using a effect adjustment signal MOD that is obtained by continuously changing the special image effect adjustment signal DS. The visual processing portion 30 can convert the tone level of the image signal IS according to the synthesized signal MUS that is output from the effect adjustment portion 20.

Thus, even if a special image has been input, the visual processing device 1 can detect the special image and the visual processing portion 30 can differ the effect of visual processing for the special image in order to suppress artifacts.

The functional portions of the visual processing device 1 are described below.

The spatial processing portion 10 extracts the value of a target pixel and the values of pixels in the region around the target pixel (hereinafter, called "surrounding pixels") from the image signal IS, and uses the values of the pixels that it has extracted to perform filter processing on the image signal IS.

For example, the spatial processing portion 10 performs a low-pass filter on the image signal IS to create an unsharp signal US from the image signal IS. The unsharp signal US is created by a computation such as the following.

$$US = (\Sigma [W_{ij}] \times [A_{ij}])/(\Sigma [W_{ij}])$$

Here, [Wij] is the weight coefficient of the pixel located at the i-th row j-th column among the target pixel and the surrounding pixels, and [Aij] is the pixel value of the pixel located at the i-th row j-th column among the target pixel and the surrounding pixels. The symbol $\Sigma$ means to calculate the sum for the target pixel and the surrounding pixels.

It should be noted that it is possible to assign a weight coefficient with a smaller value the larger the absolute value of the difference between pixel values, and it is also possible to assign a smaller weight coefficient the larger the distance from the target pixel. The region of the surrounding pixels is a size that is set in advance according to the effect, and the visual effect can be increased by setting this region to size that is larger than a predetermined size. For example, if the size of the target image is 1024 pixels vertically by 768 pixels horizontally, then by creating an unsharp signal US from a region that is at least 80 pixels vertically by 80 pixels horizontally, the visual effect can be increased compared to each local region of about 3 pixels vertically by 3 pixels horizontally.

A spatial filter such as a FIR (Finite Impulse Response)-type low-pass spatial filter or an IIR (Infinite Impulse Response)-type low-pass spatial filter can be used as the low-pass filter.

Next, the effect adjustment portion 20 synthesizes the image signal IS and the unsharp signal US by interpolation in accordance with the effect adjustment signal MOD that has been output from the continuous changing portion 50, and outputs a synthesized signal MUS. The synthesized signal MUS is obtained through an interpolation computation such as Eq. 1 in accordance with the effect adjustment signal MOD. The continuous changing portion 50 is described later.

$$MUS = US \times MOD + IS \times (1.0 - MOD) \qquad \text{Eq. 1}$$

Here, the value of the effect adjustment signal MOD changes within the range of 0.0 to 1.0, with no visual processing effect when the value of the effect adjustment signal MOD is 0.0, and a maximum visual processing effect when it is 1.0. It should be noted that Eq. 1 can be modified to Eq. 2, and the synthesized signal MUS can be similarly created.

$$MUS = (US - IS) \times MOD + IS \qquad \text{Eq. 2}$$

Next, the visual processing portion 30 converts the tone level of the image signal IS in accordance with the synthesized signal MUS from the effect adjustment portion 20.

Figure 2:
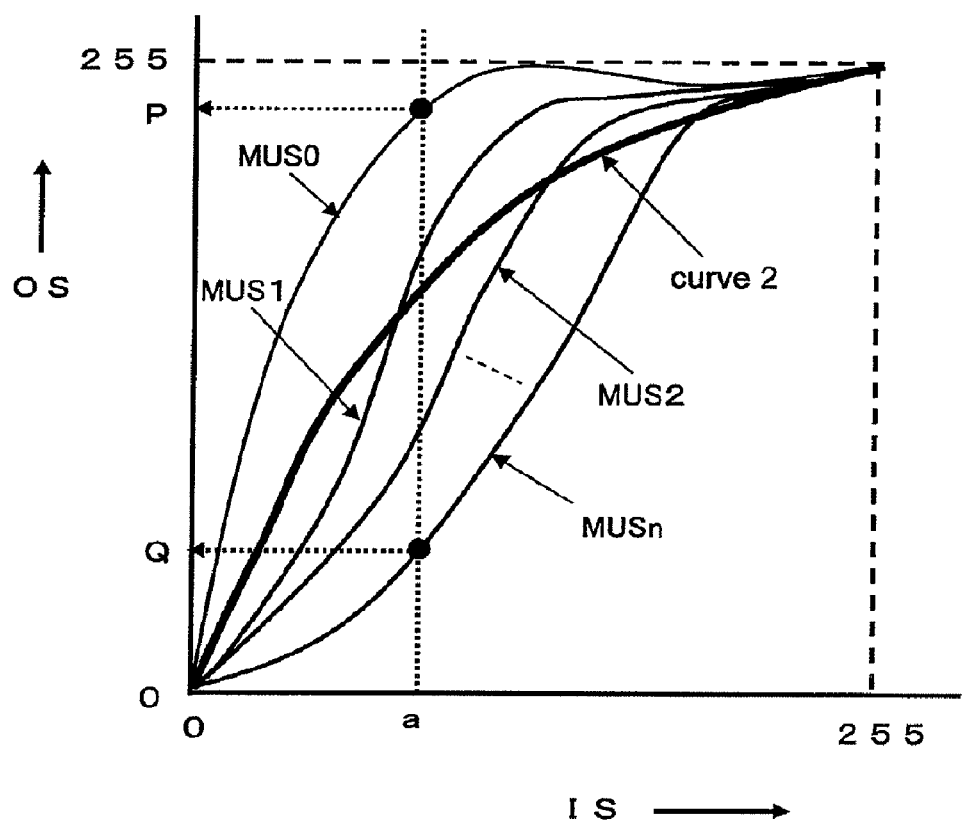
FIG. 2 is an explanatory diagram for describing the two-dimensional tone conversion characteristics of the same.

The visual processing portion 30 performs tone conversion based on the two-dimensional tone conversion characteristics shown in FIG. 2, for example. Here, two-dimensional tone conversion refers to tone conversion in which the value of the output is determined with respect to the two inputs of the synthesized signal MUS and the image signal IS. The visual processing portion 30 outputs a processed signal OS with respect to the image signal IS and the synthesized signal MUS based on the two-dimensional tone conversion characteristics. Various visual effects can be produced with the tone conversion characteristics.

The two-dimensional tone conversion characteristics shall be described using FIG. 2. FIG. 2 is an explanatory diagram for describing the two-dimensional tone conversion characteristics. Here, the horizontal axis is the image signal IS that has been input, and the vertical axis is the output of the converted processed signal OS.

As shown in FIG. 2, two-dimensional tone conversion has predetermined tone conversion characteristics according to the signal level of the synthesized signals MUS0 through MUSn.

That is, two-dimensional tone conversion is achieved by selecting any one of the tone conversion curves MUS0 to MUSn based on the signal level (tone level) of the synthesized signal MUS, and the input signal IS (tone level of the IS) is converted to a processed signal OS (tone level of OS) based on the tone conversion curve that has been selected. For example, when the MUS signal level (tone level) is 1, the tone conversion curve MUS1 of FIG. 2 is selected, and when the MUS signal level (tone level) is 120, the tone conversion curve MUS120 of FIG. 2 is selected. However, it is not absolutely necessary to prepare as many tone conversion curves MUS0 through MUSn as the number of tone levels of the MUS signal, and for example, it is also possible to achieve two-dimensional tone conversion by preparing fewer tone conversion curves MUS0 to MUSn than the number of tone levels of the MUS signal, and for the tone conversion curves that have not been prepared, calculating a tone conversion curve that corresponds to the tone level of the MUS signal by interpolation from the tone conversion curves that have been prepared already.

When the pixel value of the image signal IS is an 8-bit value, the pixel value of the output signal OS with respect to the value of the input signal IS separated into 256 levels is determined based on the predetermined two-dimensional tone conversion characteristics. The tone conversion characteristics are tone conversion curves that have predetermined gamma conversion characteristics, and have the relationship where the output monotonically decreases along with the subscript of the synthesized signal MUS. It should be noted that even if there are ranges where the output partially does not monotonically decrease along with the subscript of the synthesized signal MUS, it is sufficient for the output to be substantially monotonically decreasing. As shown in FIG. 2, the two-dimensional tone conversion characteristics satisfy the relationship of (the output value when MUS=MUS0)≧ (the output value when MUS=MUS1)≧ . . . ≧(the output value when MUS=MUSn) with respect to the brightness value of all image signals IS.

According to the two-dimensional tone conversion characteristics shown in FIG. 2, for an image signal IS with a value of "a" that has been input, the visual processing portion 30 selects MUS0 when the brightness value of the surrounding region is small to obtain a value "P" for the processed signal OS, and selects MUSn when the brightness value of the surrounding region is large in order to obtain a value "Q" for the processed signal OS. In this way, even for an input image signal IS with the value "a," the processed signal OS can be significantly changed from the value "P" to the value "Q" depending the change in the brightness value of the surrounding region. By doing this, the contrast of dark areas can be enhanced according to the synthesized signal MUS.

On the other hand, if the synthesized signal MUS is made equal to the image signal IS in order to eliminate the effect of visual processing, then it is possible to have the tone conversion characteristics of curve 2 shown in FIG. 2. With the tone conversion characteristics of curve 2, brightness adjustment (gamma conversion) of the entire image is possible, but there is no visual effect such as an increase in the local contrast.

It should be noted that it is possible to produce various visual processing effects by changing these two-dimensional tone conversion characteristics, and thus the visual processing can be adopted for knee processing, DR compression, color processing, or brightness adjustment (including tone processing and contrast adjustment).

Figure 3:
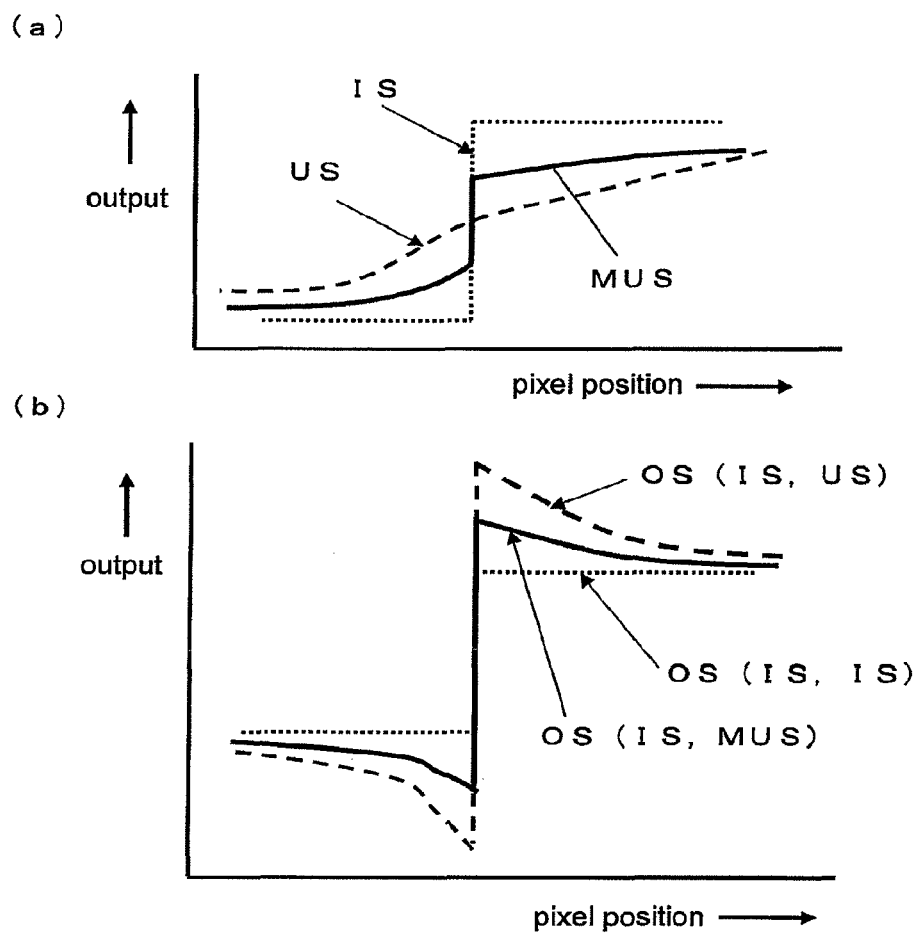
FIG. 3 is an explanatory diagram for describing the output of the processed signal of the same.

Next, he processed signal OS when the effect of visual processing has been differed based on the synthesized signal MUS by the visual processing portion 30 is described using FIG. 3. FIG. 3 is an explanatory diagram for describing the output of the processed signal OS.

In FIG. 3(a), the horizontal axis is the pixel position to be processed, and the vertical axis is the output of the synthesized signal MUS.

For example, when the value of the effect adjustment signal MOD has been set to 0.5, the synthesized signal MUS becomes an output that is intermediate between the image signal IS and the unsharp signal US.

At this time, as shown in FIG. 3(b), if OS(IS,IS) is a processed signal OS that has been processed based on only the image signal IS and OS(IS,US) is a processed signal OS that has been processed based on the image signal IS and the unsharp signal US, then a processed signal OS(IS,MUS) that has been obtained by visual processing based on the image signal IS and the synthesized signal MUS is an output that is intermediate between OS(IS,IS) and OS(IS,US).

Thus, the synthesized signal MUS is equal to US when the value of the effect adjustment signal MOD is 1.0, and a processed signal OS(IS,US) in which the visual processing effect is a maximum is output. On the other hand, the synthesized signal MUS is equal to IS when the value of the effect adjustment signal MOD is 0.0, and a processed signal OS(IS, IS) in which there is no visual processing effect is output.

In this way, the visual processing portion 30 can strengthen or weaken the effect of the enhancing the local contrast according to the synthesized signal MUS. Thus, the visual processing device 1 can achieve various visual effects that are different effects, from the effect of processing in which only the brightness of the overall image is transformed, to the effect of processing in which the contrast in local regions is varied (changed) with the surrounding brightness.

It should be noted that the visual processing device 1 can achieve knee processing, DR compression processing, and color processing, for example, by changing the two-dimensional tone conversion characteristics.

It is also possible for the visual processing portion 30 to have a 2D LUT. In this case, the visual processing portion 30 performs tone conversion by setting the characteristic data (hereinafter, referred to as the "profile") shown in FIG. 2 in the 2D LUT of the visual processing portion 30.

The visual processing portion 30 can also perform visual processing through an arithmetic circuit. In particular, if the 2D LUT of the visual processing portion 30 is provided with profiles, which are characteristics that can be approximated by a simple line, then it is possible to eliminate the table of the 2D LUT and reduce the circuit scale of the visual processing device 1.

Next, the special image detection portion 40 is described using FIGS. 4 through 7. Here, a case in which the bias of the information of the special image is detected from the proportion of regions in which the gradation changes in the image. The change in the gradation is detected from the edge component.

Figure 4:
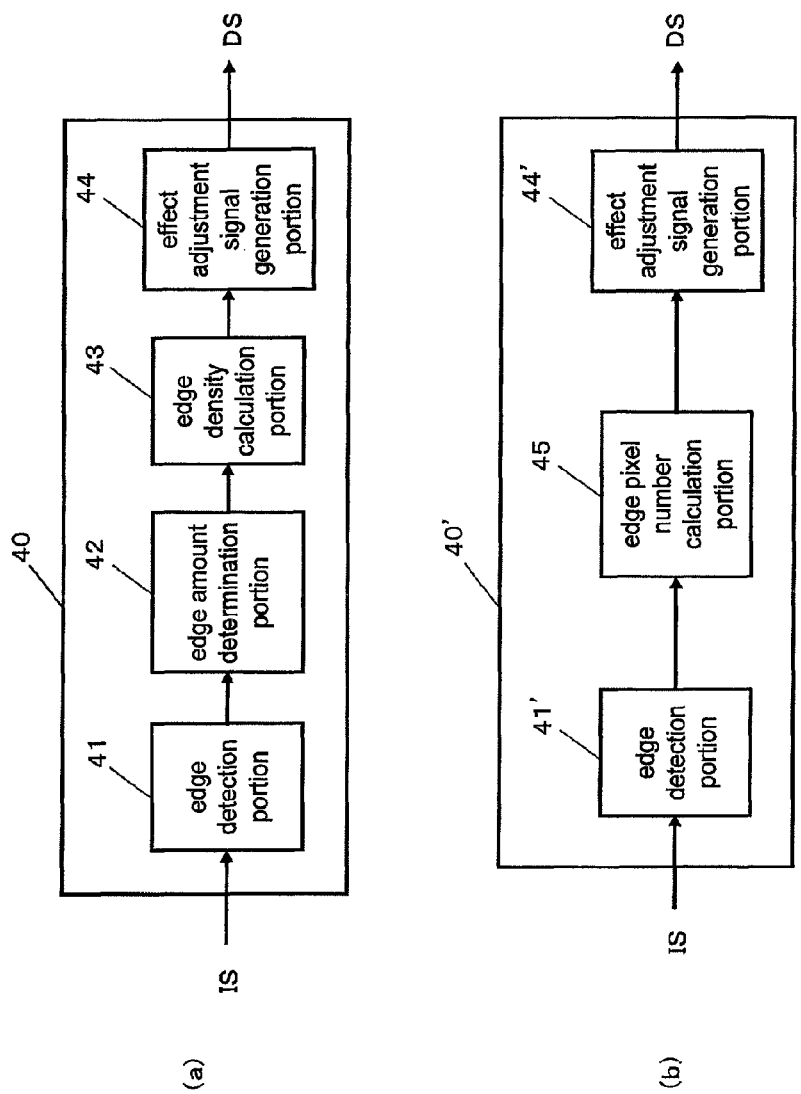
FIG. 4 is a block diagram that shows the configuration of the special image detection portion of the same.
Figure 5:
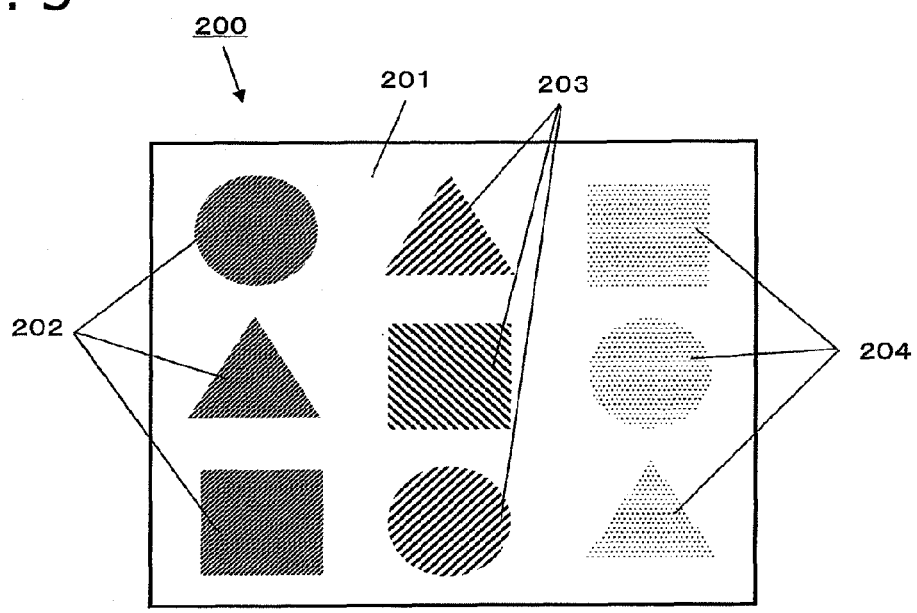
FIG. 5 is an explanatory diagram for describing the special images of the same.
Figure 6:
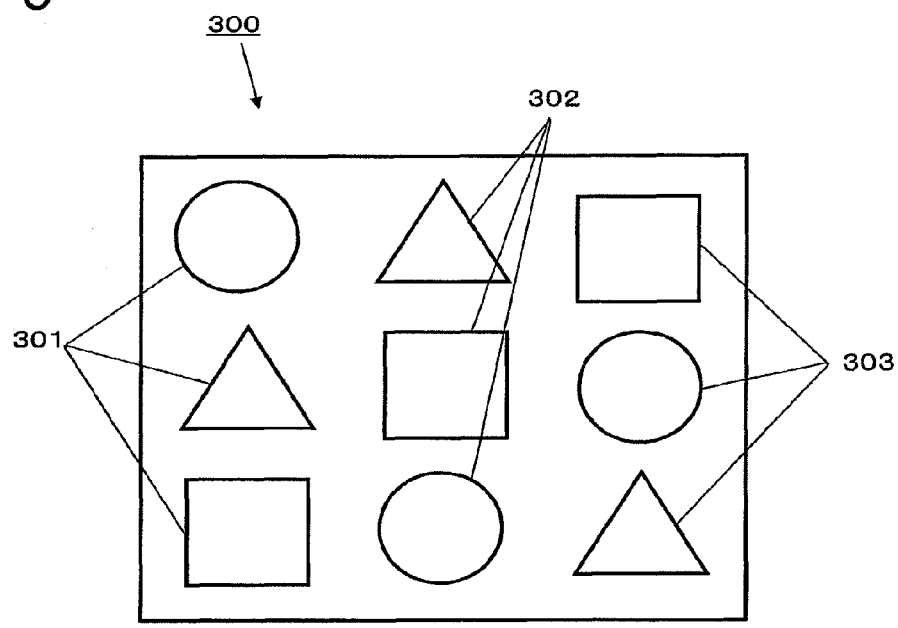
FIG. 6 is an explanatory diagram for describing edge pixels of the same.
Figure 7:
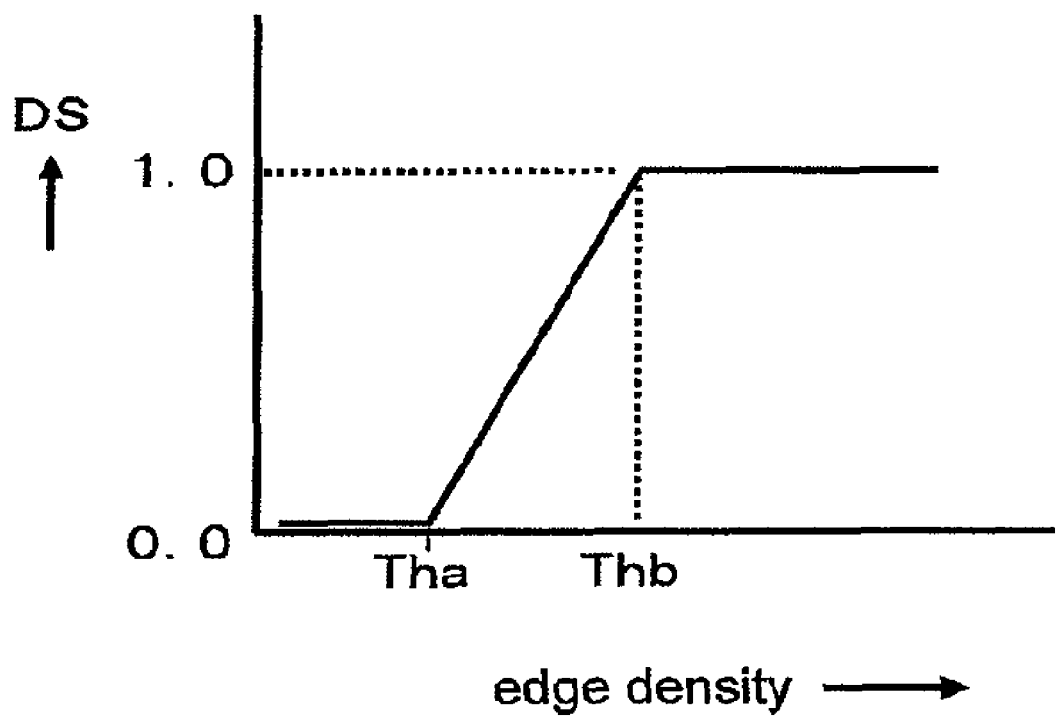
FIG. 7 is an explanatory diagram for describing the output of the effect adjustment signal of the same.

FIG. 4 is a block diagram showing the configuration of the special image detection portion 40, FIG. 5 is an explanatory diagram for describing the special image, FIG. 6 is an explanatory diagram for describing the edge pixels, and FIG. 7 is an explanatory diagram for describing the output of the special image effect adjustment signal DS.

As shown in FIG. 4, the special image detection portion 40 is provided with an edge detection portion 41 for detecting an edge amount for each pixel from the image signal IS, an edge amount determination portion 42 for determining an edge pixel in which the edge amount is equal to or greater than a predetermined value, an edge density calculation portion 43 for calculating the ratio of the number of edge pixels to the total number of pixels in the image signal IS, and an effect adjustment signal generation portion 44 for outputting a special image effect adjustment signal DS according to the ratio that has been calculated by the edge density calculation portion 43.

Thus, with the visual processing device 1 it is possible to detect special images with an extremely small tone level number in which the edge component is restricted to the border region of a drawing image, and the bias of that information can be detected.

Natural images are abound with areas of continuous, complex brightness changes. That is, natural images have many (the number of edges is high) small change edges (weak edge). On the other hand, special images have many sections with a uniform brightness, and the pixels that form special images take on few tone levels. In other words, special images have a low percentage of edges with large changes (strong edges).

Accordingly, regardless of the strength of the edge, the determination is made using the statistical shifts in the number of pixels that are regarded as edges (edge pixels). That is, an image is determined to be more natural image-like the greater the number of edge pixels (the larger the percentage of edge pixels of the total pixel number) and is determined to be more special image-like the smaller the number of edge pixels.

The special image detection portion 40 detects a statistical bias from a frame image one or more frames prior when the image signal is a frame image, and detects a statistical bias from a field image one or more fields prior when the image signal is a field image. By doing this, the visual processing device 1 can use a special image effect adjustment signal DS that corresponds to the bias of the information of the special image from the top of the frame or the field.

For example, a case in which the special image detection portion 40 processes the special image 200 shown in FIG. 5 is described. As shown in FIG. 5, the special image 200 has a background region 201, a pattern group 202, a pattern group 203, and a pattern group 204, and each one of these regions has a tone level (gradation value) that is constant or that fluctuates little. Each group is made of different shapes whose tone level (gradation value) is substantially the same.

The edge detection portion 41 detects the edge amount for each pixel from the image signal IS. The edge detection portion 41 detects the edge amount using an edge detection filter (not shown) such as a first-order derivative filter like a Sobel filter or a Prewitt filter or a second-order derivative filter like a Laplacian filter.

The edge amount determination portion 42 compares the edge amount and a threshold value that has been set in advance for each pixel, and determines that a pixel is an edge pixel when the edge amount is equal to or greater than the predetermined threshold value.

For example, due to the processing of the special image 200 by the edge amount determination portion 42, an output 300 such as that shown in FIG. 6 is obtained.

In FIG. 6, the edge pixels are the edge pixels 301, the edge pixels 302, and the edge pixels 303, and occur in the border region of the graphic patterns of the special image 200.

Next, returning to FIG. 4, the edge density calculation portion 43 calculates the edge density, which is the ratio of the number of edge pixels to the total number of pixels in the image signal IS, as follows.

edge density=edge pixel number÷total pixel number

Here, if the image signal IS is a frame image, then the edge density is the ratio of the edge pixel number to the total pixel number in the frame. If the image signal IS is a field image, then the edge density is the ratio of the edge pixel number to the total pixel number in the field.

The effect adjustment signal generation portion 44 adjusts the output according to the edge density. In other words, the effect adjustment signal generation portion 44 outputs a special image effect adjustment signal DS with a larger signal level (value) the larger the edge density. For example, as shown in FIG. 7, it increases the signal level of the special image effect adjustment signal DS when the edge density is in the range from a predetermined value Tha to a predetermined value Thb. By setting threshold values in this way, it is possible to create a special image effect adjustment signal DS in which the visual effect has been completely eliminated if the edge density is below the threshold value Tha, which is included in special images. On the other hand, if a pixel is greater than a threshold value Yhb, which is included in normal images that are not special images, it is possible to create a special image effect adjustment signal DS for processing without weakening the visual effect. Here, the horizontal axis is the edge density, and the vertical axis is the output of the special image effect adjustment signal DS. It should be noted that the range of the signal level of the special image effect adjustment signal DS has been set from 0.0 to 1.0, but it is also possible to adjust this to 0.2 to 1.0, for instance, in accordance with the strength of the visual processing. The visual processing device 1 is configured such that the effect of visual processing becomes stronger the larger the signal level of the special image effect adjustment signal DS.

The continuous changing portion 50 operates to continuously change the effect adjustment signal MOD between frames when the special image effect adjustment signal DS is output in frame units, or between fields when the special image effect adjustment signal DS is output in field units. For example, the continuous changing portion 50 is provided with a memory portion (not shown) such as a register for temporarily storing the special image effect adjustment signal DS, and creates the effect adjustment signal MOD by interpolating the special image effect adjustment signal DS that is output from the special image detection portion 40 in a new frame and the special image effect adjustment signal DS that has been stored temporarily, and this effect adjustment signal MOD that is created is stored in the memory portion. The memory portion stores the first special image effect adjustment signal DS that is detected as an initial value. The continuous changing portion 50 outputs the effect adjustment signal MOD that is created through this interpolation computation. By doing this, the effect adjustment signal MOD is kept from changing abruptly between frames. The continuous changing portion 50 can be achieved by an IIR-type filter, for example.

Figure 8:
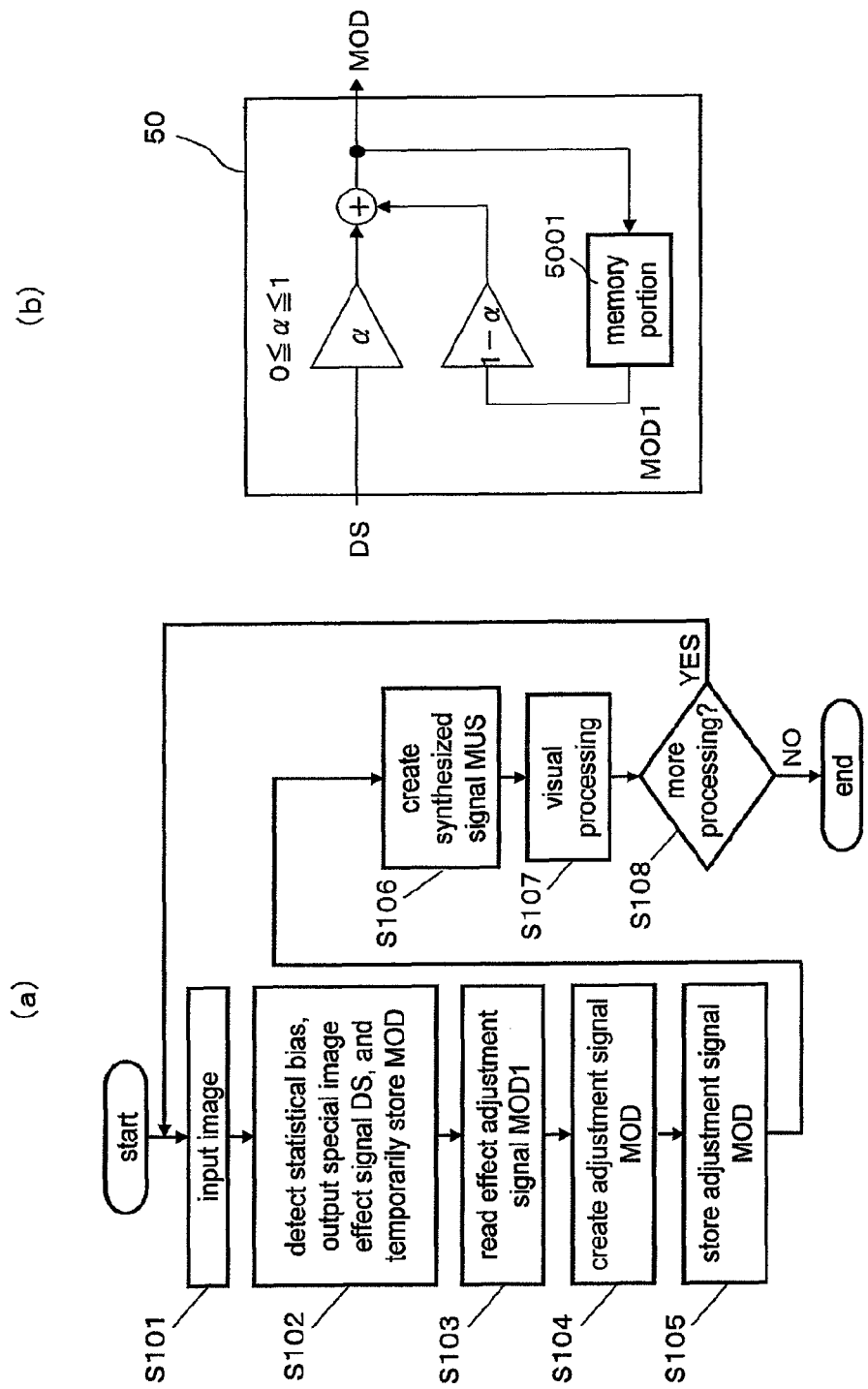
FIG. 8 is a flowchart that describes the operation of the visual processing device and also is a structural diagram of the continuous changing portion.

Next, the operation of the visual processing device 1 is described using FIG. 8. FIG. 8(a) is a flowchart for describing the operation of the visual processing device 1. FIG. 8(b) is a diagram that shows an example of the configuration of the continuous changing portion 50.

As shown in FIGS. 8(a) and (b), if the image signal IS is a frame image, then in order to detect a statistical bias from the frame image one or more frames prior, a plurality of frame images are input to the visual processing device 1. Alternatively, if the image signal IS is a field image, then in order to detect a statistical bias from the field image one or more fields prior, a plurality of field images are input to the visual processing device 1 (S101). Once a plurality of frame images or a plurality of field images have been input to the visual processing device 1, the special image detection portion 40 detects a special image from the image signal IS, which is a frame image or a field image to be detected, and outputs a special image effect adjustment signal DS that corresponds to the statistical bias of the special image that has been detected (S102).

Here, in order to detect statistical bias, a frame image (field image) one or more frames (fields) prior is input to the visual processing device 1 in order to immediately start processing on the frame image (field image) that is currently the target of visual processing. In order words, this is so that the visual processing device 1 executes visual processing on the image signal IS without waiting until the output of a special image effect adjustment signal DS corresponding to the shift in the statistical information. Ordinarily, there is a high degree of correlation between frame (field) images that are near one another, and thus there is no problem with detecting shifts in the statistical information from frame images (field images) one or more frames (fields) earlier (however, there is a certain limit to the number of earlier frames (fields) proximate to the current frame (current field)). It should be noted that it is also possible to detect shifts in the statistical information from the current frame image(current field image) and then output a special image effect adjustment signal DS that corresponds to this. In this case, the image signal IS that makes up the current frame image(current field image) is delayed until the special image effect adjustment signal DS is output(for example, it is delayed using a frame (field) memory), and when the special image effect adjustment signal DS is output, that special image effect adjustment signal DS is used to perform visual processing on the image signal IS that makes up the current frame image (current field image).

Next, the visual processing device 1 performs interpolation such that the effect adjustment signal MOD is continuously changing between frames. The visual processing device 1 reads the effect adjustment signal MOD1 of one frame prior, which has been temporarily stored in a memory portion 5001 such as a register for temporary storage by the continuous changing portion 50 (S103), and the special image effect adjustment signal DS that was detected in step S102 and the effect adjustment signal MOD1 that was read in step S103 are interpolated by an interpolation computation, for example, and the effect adjustment signal MOD that is created by this interpolation processing is output from the continuous changing portion 50 (S104). Thus, sudden changes that occur between processed frame images are suppressed, and it is possible to suppress flickering of the image, for example, that results from differences in the visual effect.

It should be noted that in a case where there is little need to inhibit flickering, for example, of the image due to differences in the visual effect, it is also possible to simplify the configuration of the visual processing device 1 by eliminating the continuous changing portion 50, and using the special image effect adjustment signal DS instead of the effect adjustment signal MOD.

Next, the visual processing device 1 temporarily stores the effect adjustment signal MOD that has been created by interpolating the special image effect adjustment signal DS and the effect adjustment signal MOD1 in the memory portion 5001 (S105). If the interpolation processing is the result of an internal division computation, then the ratio of that interpolation can be given in advance.

Next, the effect adjustment portion 20 of the visual processing device 1 creates a synthesized signal MUS by synthesizing the image signal IS and the unsharp signal US from the spatial processing portion 10 in accordance with the effect adjustment signal MOD (S106).

The visual processing portion 30 of the visual processing device 1 then selects one of the curves of the two-dimensional tone conversion characteristics shown in FIG. 2 and transforms the image signal IS according to the synthesized signal MUS (S107).

Next, the visual processing device 1 determines whether or not there is a frame image to process next (S108). If there are no more frame images that require processing, then the visual processing is completed. On the other hand, if there are frame images that require processing, then the procedure is returned to step S101 and the next frame image is input. Thereafter, the steps from S101 to S108 are repeated until there are no longer any frames that require processing.

It should be noted that above, a case in which interpolation processing is performed so to continuously change the effect adjustment signal MOD between frames, but the target for interpolation processing is not limited to between frames, and it may also be between fields as well.

In the visual processing device 1, it is also possible to use a special image detection portion 40', which is shown in FIG. 4(b), in place of the special image detection portion 40 shown in FIG. 4(a). The special image detection portion 40' is provided with an edge detection portion 41' that detects, from the image signal IS, the edge pixels that are included in the image region of a single image that is formed by the image signal IS, an edge pixel number calculation portion 45 that calculates the number of edge pixels that are detected by the edge detection portion 41' as an edge pixel number, and an effect adjustment signal generation portion 44' that outputs an effect adjustment signal according to the edge pixel number.

With the special image detection portion 40', the effect adjustment signal generation portion 44' outputs a special image effect adjustment signal DS based on a function ffn (NN) in which the variable is the edge pixel number NN that is calculated by the edge pixel number calculation portion 45 (as the function ffn(NN), for example, if NN<tth1 then ffn (NN)=0, if tth1≦NN≦tth2 then ffn(NN)=(NN−tth1)/(tth2− tth1), and if NN>tth2 then ffn(NN)=1 (tth2>tth1)). Using this special image effect adjustment signal DS, it is possible to achieve the visual processing of the visual processing device 1.

As discussed above, with the visual processing device 1 of the first embodiment of the invention, even if a special image has been input, the edges in the image are detected and the effect of visual processing is adjusted based on the edge amount that has been detected, and thus it is possible to increase the visual effect in natural images while suppressing artifacts in special images.

It should be noted that the method of detecting a statistical bias is not limited to the method of the special image detection portion 40 discussed above. Special images have a statistical bias, such as either an extremely low proportion of regions in which the gradation changes in the image of the image signal IS, or an extremely large proportion of regions in which the gradation does not change in the image of the image signal IS.

MODIFIED EXAMPLE

Another modified example of the method of detecting a statistical bias is described below.

First Modified Example

First, a special image detection portion 40 according to a first modified example is described. With the special image detection portion 40 according to the first modified example, a statistical bias is detected from the proportion of regions in which the gradation does not change in the image of the image signal IS. Regions in which the gradation does not change can be detected from the degree of flatness of the image. A method of detecting a bias in the number of tone levels from the image signal IS is adopted as the method for detecting the degree of flatness. In images in which the there are very few tone levels (number of tones) that can be taken for the pixels making up the image (images in which there is an extremely narrow distribution of the number of tone levels taken by the pixels), there is a wide region in which the gradation is constant, and thus the degree of flatness in the image becomes higher. The degree of the special image can be found from this bias in information.

Figure 9:
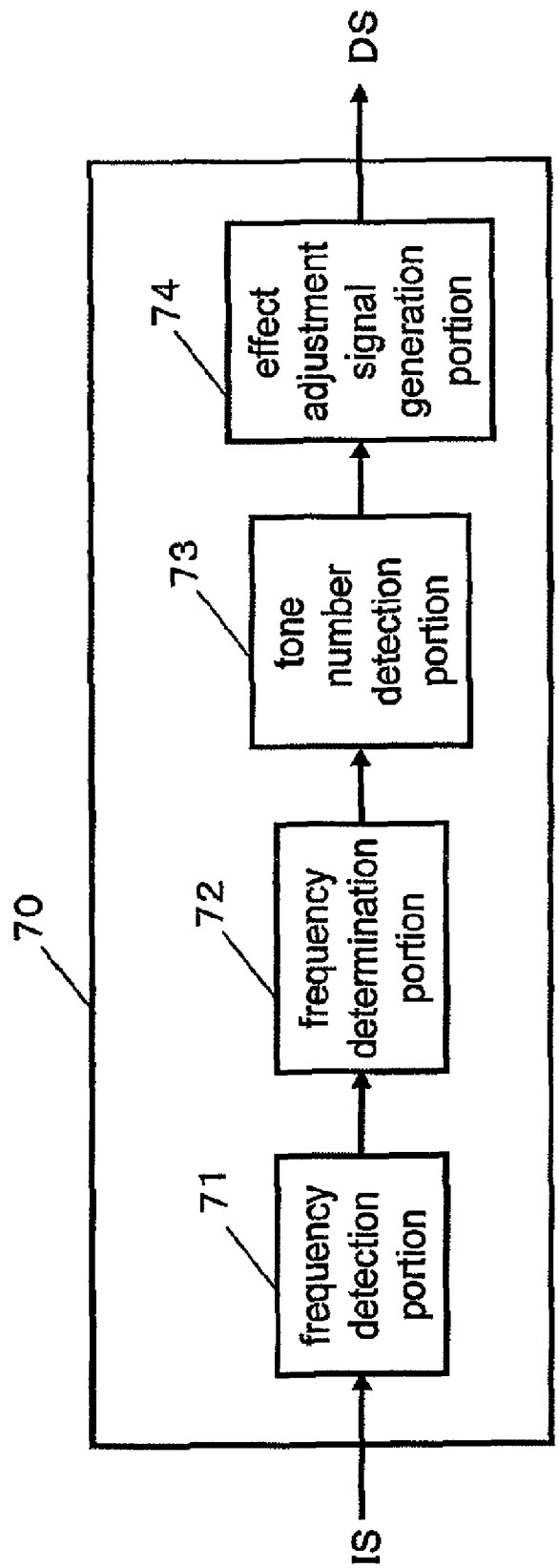
FIG. 9 is a block diagram that shows the configuration of a special image detection portion of a first modified example of the same.
Figure 10:
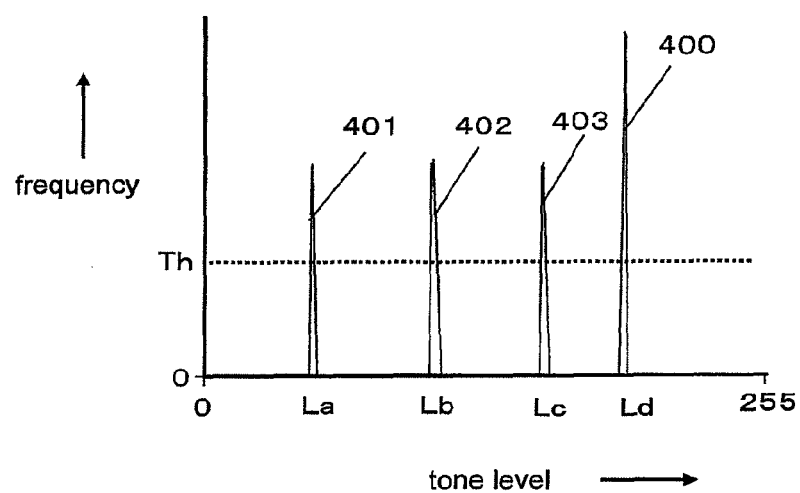
FIG. 10 is an explanatory diagram for describing the frequency distribution that is detected by the frequency detection portion (classifier) of the first modified example of the same.
Figure 11:
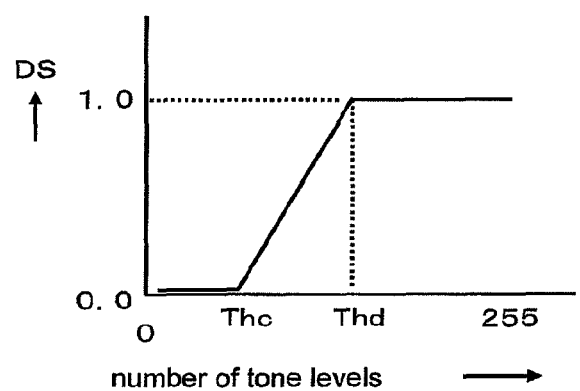
FIG. 11 is an explanatory diagram for describing the effect adjustment signal of the first modified example of the same.

Using FIGS. 9, 10, and 11, a first modified example of a case in which a bias in the tone level number is detected from the image signal IS is described. FIG. 9 is a block diagram showing the configuration of the special image detection portion 70 of the first modified example, FIG. 10 is an explanatory diagram for describing the frequency distribution that is detected by a frequency detection portion 71 of the first modified example, and FIG. 11 is an explanatory diagram for describing the special image effect adjustment signal DS that is output from the special image detection portion 70 of the first modified example.

As shown in FIG. 9, the special image detection portion 70 is provided with a frequency detection portion (classifier) 71 for detecting the frequency of each tone level from the image signal, a frequency determination portion 72 for comparing the frequency of each tone level with a predetermining threshold and determining whether the tone level has a higher frequency than the predetermined threshold, a tone level number detection portion 73 for detecting the number of tone levels that have been determined to be high frequency by the frequency determination portion 72, and an effect adjustment signal generation portion 74 for outputting an effect adjustment signal in accordance with the number of tone levels that has been detected by the tone level number detection portion 73.

The frequency detection portion (classifier) 71 detects the frequency of each tone level from the image signal using a histogram method. For example, if the image signal has 256 tone levels, then it detects the frequency with which the tone levels appear from 0 to 255.

The frequency determination portion 72 compares the frequency of each tone level with a predetermining threshold to detect tone levels with a higher frequency than the predetermined threshold.

As shown in FIG. 10, the frequency determination portion 72 determines that a frequency 401 is larger than a predetermined threshold Th at a tone level La. Similarly, the frequency determination portion 72 determines that a frequency 402, a frequency 403, and a frequency 400 are each larger than a predetermined threshold Th at the tone levels Lb, Lc, and Ld. Here, the horizontal axis in FIG. 10 is the tone level, and the vertical axis is the frequency.

The tone level number detection portion 73 calculates the number of tone levels that have been determined to be high frequency by the frequency determination portion 72.

Based on the number of tone levels that has been calculated, the effect adjustment signal generation portion 74 increases the signal level (value) of the special image effect adjustment signal DS the larger the tone level number and outputs the special image effect adjustment signal DS. For example, as shown in FIG. 11, the signal level (value) of the special image effect adjustment signal DS is increased over the range of a calculated tone level number of the predetermined value Thc to the predetermined value Thd.

By providing threshold values in this way, it is possible for the effect adjustment signal generation portion 74 to create a special image effect adjustment signal DS for eliminating the visual effect completely if the tone level number is equal to or below the threshold Thc, which is included in special images. On the other hand, the effect adjustment signal generation portion 74 can create a special image effect adjustment signal DS for processing without weakening the visual effect if the tone level number is equal to or greater than a threshold value Thd, which is included in normal images that are not special images. Here, the horizontal axis is the tone level number, and the vertical axis is the output of the special image effect adjustment signal DS. It should be noted that the range of the value of the special image effect adjustment signal DS that is output has been set from 0.0 to 1.0, but it is also possible to adjust this to from 0.2 to 1.0, for instance, in accordance with the strength of the visual processing. The visual processing device 1 is configured such that the effect of the visual processing becomes stronger the larger the value of the special image effect adjustment signal DS.

Thus, with the special image detection portion 70 of the first modified example, it is possible to detect the degree of a special image from the image signal based on the bias of the image information, and the special image detection portion 40 can be substituted with the special image detection portion 70.

Second Modified Example

Next, a special image detection portion 40 according to a second modified example is described. With the special image detection portion 40 according to the second modified example, the statistical bias is detected from the proportion of regions in which the gradation does not change in the image of the image signal IS. Regions in which the gradation does not change can be detected by the degree of flatness of the image. As the method for detecting the degree of flatness, a method in which a continuous length of analogous pixels whose difference in luminance with adjacent pixels is below a predetermined value is detected from the image signal IS, and then a mean continuous length obtained by taking the mean of a plurality of continuous lengths that have been detected is adopted. By doing this, it is possible to detect the degree of the special image. In special images, there are broad regions of constant gradation, and thus the degree of flatness in the image is high and many pixels with an analogous luminance follow one other. In other words, it is possible to detect the degree of a special image from the statistical bias.

Figure 12:
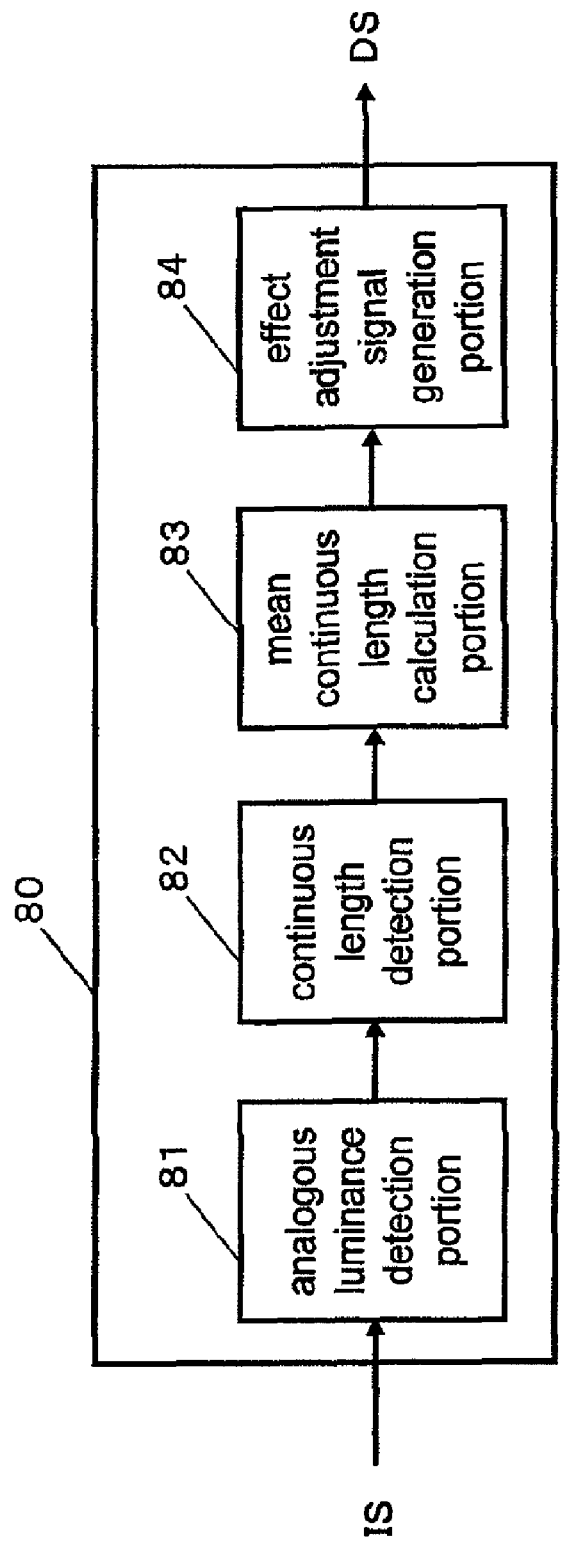
FIG. 12 is a block diagram that shows the configuration of the special image detection portion of a second modified example of the same.
Figure 13:
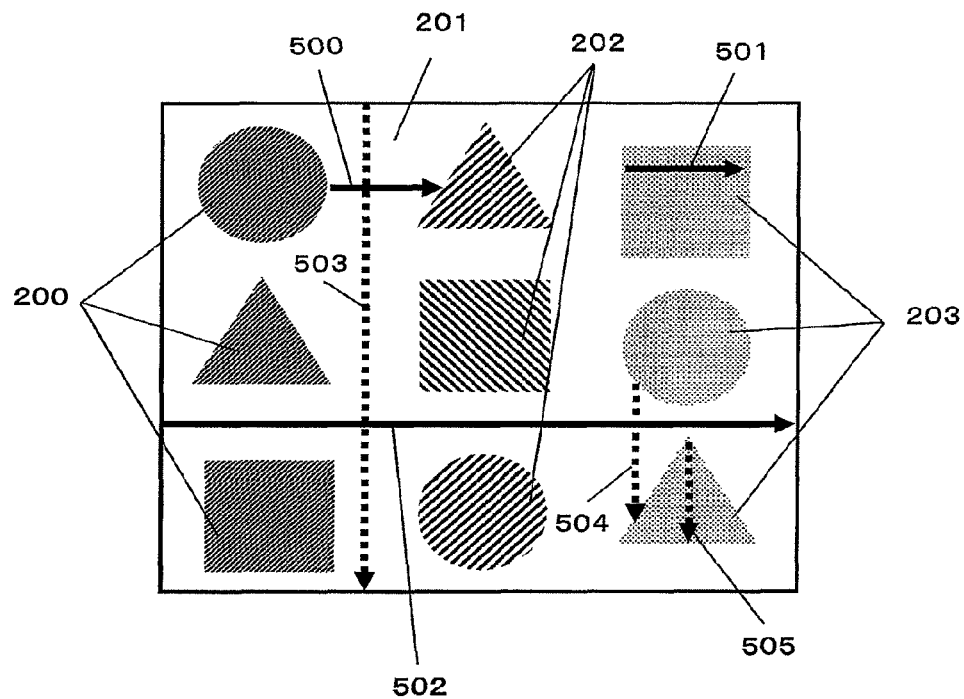
FIG. 13 is an explanatory diagram for describing the continuous lengths of the second modified example of the same.
Figure 14:
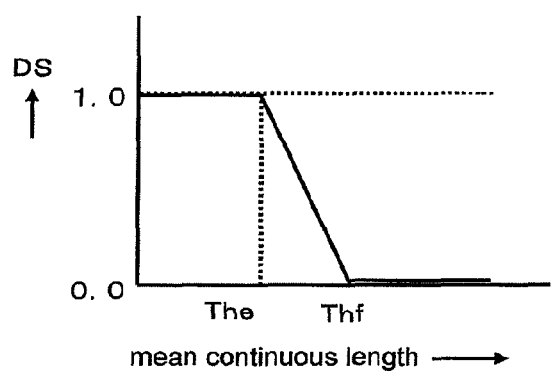
FIG. 14 is an explanatory diagram for describing the effect adjustment signal of the second modified example of the same.

The case of the second modified example, in which continuous lengths when analogous luminance signals are continuous are detected from the image signal, is described using FIGS. 12, 13, and 14.

FIG. 12 is a block diagram showing the configuration of the special image detection portion 80 of the second modified example, FIG. 13 is an explanatory diagram for describing the continuous lengths of the second modified example, and FIG. 14 is an explanatory diagram for describing the special image effect adjustment signal DS of the second modified example.

As shown in FIG. 12, the special image detection portion 80 of the second modified embodiment is provided with an analogous luminance detection portion 81 for detecting analogous pixels whose difference in luminance with adjacent pixels is less than a predetermined value from the image signal IS, a continuous length detection portion 82 for detecting a continuous length of contiguous analogous pixels, a mean continuous length calculation portion 83 for calculating a mean continuous length by finding the mean of a plurality of continuous lengths that have been detected by the continuous length detection portion 82, and an effect adjustment signal generation portion 84 for outputting a special image effect adjustment signal DS according to the mean continuous length.

The analogous luminance detection portion 81 detects analogous pixels whose difference in luminance with adjacent pixels is equal to or less than a predetermined value from the image signal. The predetermined value is a value that is found experimentally in advance, and is determined by the picture quality specifications of a device in question.

The continuous length detection portion 82 detects continuous lengths of contiguous analogous pixels. For example, as shown in FIG. 13, multiple pixels of continuous analogous pixels are detected as continuous lengths in the vertical direction, such as the vertical direction 503, the vertical direction 504 and the vertical direction 505, and in the horizontal direction, such as the horizontal direction 500, the horizontal direction 501 and the horizontal direction 502.

The mean continuous length calculation portion 83 calculates a mean continuous length by averaging a plurality of continuous lengths that have been detected by the continuous length detection portion 82.

The effect adjustment signal generation portion 84 outputs a special image effect adjustment signal DS according to the mean continuous length, such the signal level (value) of the special image effect adjustment signal DS is smaller the longer the mean continuous length. For example, as shown in FIG. 14, it reduces the signal level (value) of the special image effect adjustment signal DS when the mean continuous length that has been detected is within the range of the predetermined value The to the predetermined value Thf. Here, the horizontal axis is the mean continuous length, and the vertical axis is the output of the special image effect adjustment signal DS.

By providing threshold values in this way, it is possible for the effect adjustment signal generation portion 84 to create a special image effect adjustment signal DS for processing without weakening the visual effect in a case where this is below a threshold value The, which includes normal images that are not special images. On the other hand, the effect adjustment signal generation portion 84 can create a special image effect adjustment signal DS in which the visual effect has been completely eliminated in a case where this is equal to or greater than the threshold Thf, which includes special images.

It should be noted that the range of the value of the special image effect adjustment signal DS has been set from 0.0 to 1.0, but it is also possible to adjust this to from 0.2 to 1.0, for instance, depending on the strength of the visual processing. The visual processing device 1 is configured such that the effect of the visual processing becomes stronger the larger the value of the special image effect adjustment signal DS.

Thus, with the special image detection portion 80 of the second modified example, it is possible to detect the magnitude of a special image that has a bias of information from the image signal, and the special image detection portion 80 can be substituted for the special image detection portion 40.

Third Modified Example

A special image detection portion 90 according to a third modified example is described next. In the third modified example, a statistical bias of information is detected from the proportion of regions in which the gradation changes in the image of the image signal IS. Regions in which the gradation changes can be detected from edge components in the image. Here, high frequency blocks that include high frequency components are detected from a plurality of blocks that have been obtained by partitioning as edge components in the image, and by detecting the ratio of the number of high frequency blocks with respect to the total number of blocks that have been obtained by partitioning, the degree that an image is a special image is detected.

Figure 15:
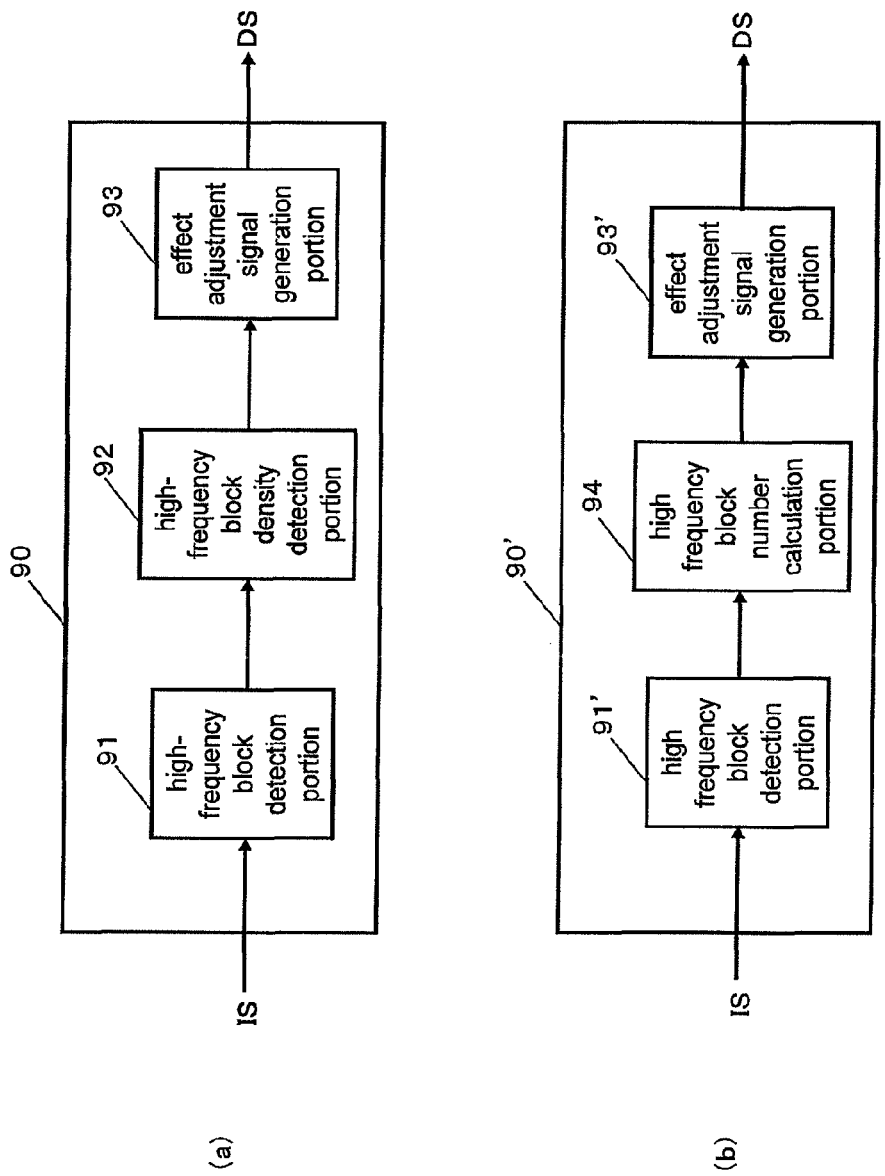
FIG. 15 is a block diagram that shows the configuration of the special image detection portion of a third modified example of the same.
Figure 16:
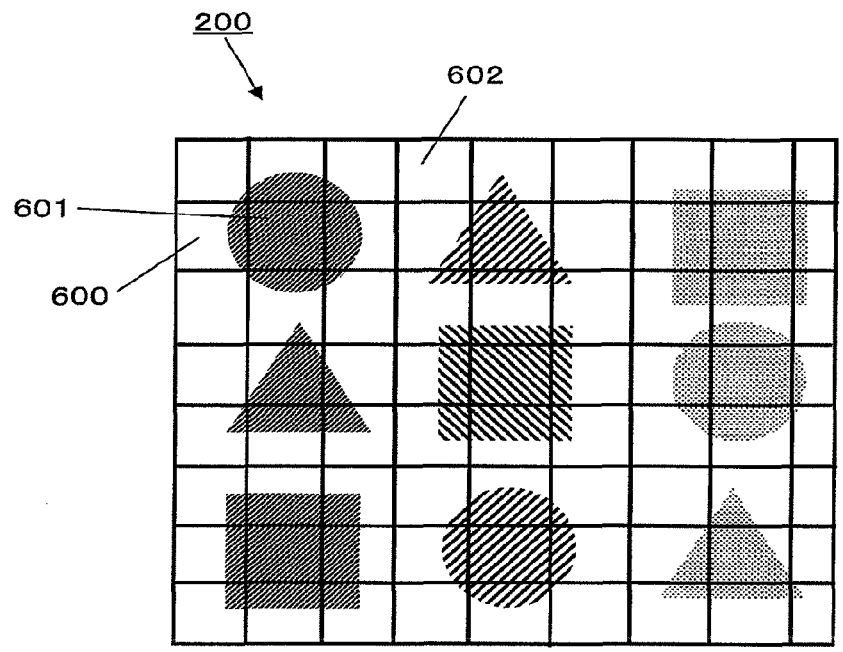
FIG. 16 is an explanatory diagram for describing the block images of the third modified example of the same.
Figure 17:
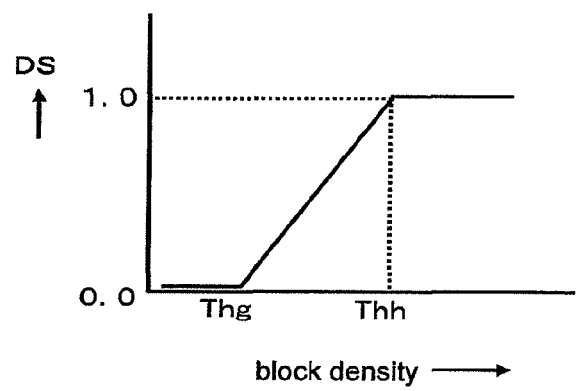
FIG. 17 is an explanatory diagram for describing the effect adjustment signal of the third modified example of the same.

The case of the third modified example, in which the ratio of the number of high frequency blocks is detected, is described using FIGS. 15, 16, and 17. FIG. 15 is a block diagram showing the configuration of the special image detection portion 90 of the third modified example, FIG. 16 is an explanatory diagram for describing the block images of the third modified example, and FIG. 17 is an explanatory diagram for describing the special image effect adjustment signal DS of the third modified example.

As shown in FIG. 15, the special image detection portion 90 of the third modified example is provided with a high-frequency block detection portion 91 for detecting high-frequency blocks that include high-frequency components from an image signal IS that has been partitioned into a plurality of blocks, a high-frequency block density detection portion 92 for detecting the ratio of the number of high-frequency blocks with respect to the total block number, and an effect adjustment signal generation portion 93 for outputting an effect adjustment signal according to the ratio of the number of blocks that has detected by the high-frequency block density detection portion 92.

The high-frequency block detection portion 91 can detect high-frequency components in each encoded block in a case where the image signal that has been input is a compressed image encoded by MPEG or JPEG, for example. For example, it can extract high-frequency components by detecting the AC coefficient of each encoded block.

The high-frequency block detection portion 91 determines that a block is a high-frequency block when a high-frequency component equal to or greater than a predetermined value has been detected.

A case in which the special image 200 has been partitioned into a plurality of blocks as in FIG. 16, for example, and high-frequency components are detected for each block, is described.

The high-frequency block detection portion 91 detects a high-frequency component in the blocks 600 because they contain a edge of the image pattern, and determines that these are "high-frequency blocks." On the other hand, the high-frequency block detection portion 91 cannot detect a high-frequency component in the blocks 601 and 602 because they each have a substantially constant tone level (gradation value), and determines that each of these is "not a high-frequency block." Hereinafter, it performs detection in the same manner for all of the blocks that have been obtained by partitioning.

The high-frequency block density detection portion 92 detects the ratio of the number of high-frequency blocks to the total number of partitioned blocks (hereinafter, this is called the "block density").

Based on the block density, the effect adjustment signal generation portion 93 increases the value of the special image effect adjustment signal DS the higher the block density, and outputs the special image effect adjustment signal DS. For example, as shown in FIG. 17, the effect adjustment signal generation portion 93 increases the value of the special image effect adjustment signal DS when the block density that has been detected is in the range of equal to or greater than a predetermined value Thg up to a predetermined value Thh. By providing threshold values in this way, it is possible for the effect adjustment signal generation portion 93 to create a special image effect adjustment signal DS in which the visual effect has been completely eliminated if the block density is below the threshold Thg, which includes special images. On the other hand, the effect adjustment signal generation portion 93 can create a special image effect adjustment signal DS for processing without weakening the visual effect if the block density is greater than a threshold value Thh, which includes normal images that are not special images. Here, the horizontal axis is the block density, and the vertical axis is the output of the special image effect adjustment signal DS. It should be noted that the range of the value of the special image effect adjustment signal DS that is output has been set from 0.0 to 1.0, but it is also possible to adjust this to from 0.2 to 1.0, for instance, depending on the strength of the visual processing. The visual processing device 1 is configured such that the effect of the visual processing becomes stronger the larger the value of the special image effect adjustment signal DS.

It is also possible to use a special image detection portion 90', which is shown in FIG. 15(b), in place of the special image detection portion 90, which is shown in FIG. 15(a), of the visual processing device 1. The special image detection portion 90' is provided with a high frequency block detection portion 91' that detects, from the image signal IS, the high frequency blocks that are included in the image region of a single image that is formed by the image signal IS, a high frequency block number calculation portion 94 that calculates the number of high frequency blocks that are detected by the high frequency block detection portion 91', and an effect adjustment signal generation portion 93' that outputs an effect adjustment signal according to the high frequency block number.

With the special image detection portion 90', for example the effect adjustment signal generation portion 93' outputs a special image effect adjustment signal DS based on a function ffk(KK) in which KK is the high frequency block number calculated by the high frequency block number calculation portion 94 (as the function ffk(KK), for example, if KK<kth1 then ffk(KK)=0, if kth1≦KK≦kth2 then ffk(KK)=(KK−kth1)/(kth2−kth1), and if KK>kth2 then ffk(KK)=1 (kth2>kth1)). Using this special image effect adjustment signal DS, it is possible to achieve the visual processing of the visual processing device 1.

Thus, with the special image detection portion 90 of the third modified example, it is possible to detect the degree of a special image that has a bias in the image information from the image signal IS, and the special image detection portion 90 can be substituted for the special image detection portion 40.

It should be noted that it is also possible for a special image having a statistical bias of information to be detected from a reduced image such as a thumbnail image obtained by reducing the image signal, and then to output an effect adjustment signal based on that statistical bias of information.

It is also possible to provide a reducing portion (not shown), for reducing the image signal, which is inserted between the input signal IS and the special image detection portion 40, 70, 80, or 90, and then detect special images having a statistical bias from the reduced image that is created by the reducing portion and output an effect adjustment signal MOD based on that statistical bias.

By using a reduced image, it is possible to detect flat regions that are near edges while suppressing the effects of noise. In other words, there is less of a noise component in a reduced image that has been created by a reduction method in which an image signal is first averaged and then thinned out, and thus it is possible to detect a statistical bias in information while suppressing the effects of noise. Further, using a reduced signal makes it possible to lower the number of pixels to be detected, and this allows the number of calculations to be reduced.

Second Embodiment

With the visual processing device 1 according to the first embodiment of the invention, a synthesized signal MUS that is synthesized altering the ratio of the image signal IS and the surrounding image information (unsharp signal) US according to an effect adjustment signal MOD is output, and the visual processing portion 30 outputs a processed signal OS that is obtained by visually processing the image signal IS according to the synthesized signal MUS from the effect adjustment portion 20, but with a visual processing device 2 according to the second embodiment of the invention, an effect adjustment portion 21 outputs a synthesized output OUT that is obtained by synthesizing the processed signal OS that has been visually processed and the image signal IS according to an effect adjustment signal. The visual processing device 2 according to the second embodiment of the invention is described using FIG. 18.

Figure 18:
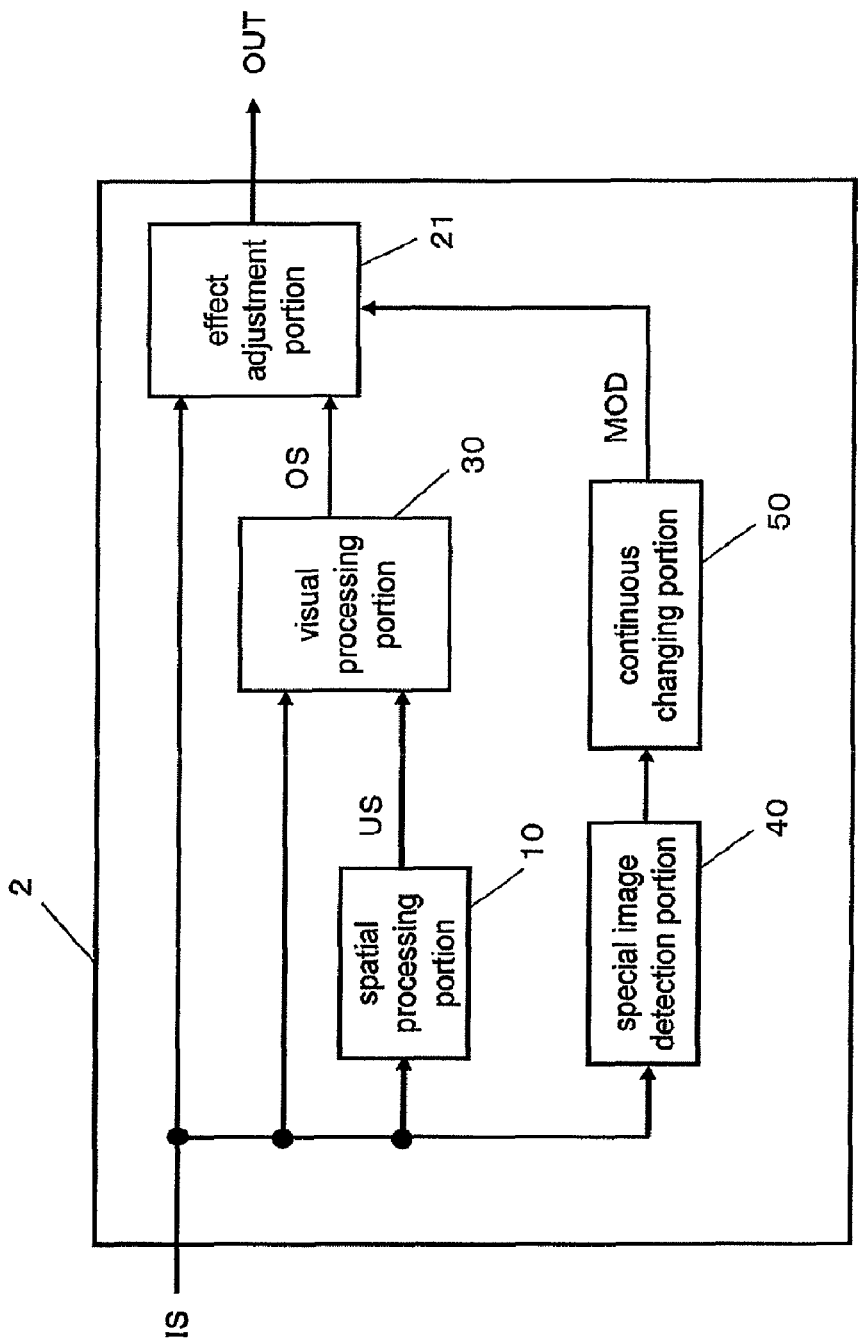
FIG. 18 is a block diagram that shows the configuration of a visual processing device according to a second embodiment of the invention.

FIG. 18 is a block diagram that shows the configuration of the visual processing device 2 according to the second embodiment of the invention. Hereinafter, sections that are identical to those of the first embodiment are assigned the same reference numerals as before and will not be described in detail.

In FIG. 18, the visual processing portion 30 outputs a processed signal OS based on the image signal IS and the output US of the spatial processing portion 10.

The effect adjustment portion 21 interpolates the image signal IS and the processed signal OS using the effect adjustment signal MOD in order to differ the effect of the visual processing. For example, the output OUT from the effect adjustment portion 21 is calculated through an interpolation calculation such as that of Eq. 3 below.

$$OUT = OS \times MOD + IS \times (1.0 - MOD) \qquad \text{Eq. 3}$$

It should be noted that Eq. 3 can be modified as shown in Eq. 4.

$$OUT = (OS - IS) \times MOD + IS \qquad \text{Eq. 4}$$

Thus, according to the visual processing device 2 of the second embodiment of the invention, it is possible to output a synthesized output OUT that is synthesized changing the proportion of the processed signal OS and the image signal IS according to the effect adjustment signal MOD, and the effect of visual processing can be differed.

It should be noted that it is also possible to substitute the special image detection portion 40 for the special image detection portion 70 of the first embodiment of the invention. In this case as well, it is possible to similarly detect special images and then create an effect adjustment signal MOD that corresponds to the bias of the image information.

It should be noted that it is also possible to substitute the special image detection portion 40 for the special image detection portion 80 of the first embodiment of the invention. In this case as well, it is possible to similarly detect special images and then create an effect adjustment signal MOD that corresponds to the bias of the image information.

It should be noted that it is also possible to substitute the special image detection portion 40 for the special image detection portion 90 of the first embodiment of the invention. In this case as well, it is possible to similarly detect special images and then create an effect adjustment signal MOD that corresponds to the bias of the image information.

Third Embodiment

With the visual processing device 1 of the first embodiment of the invention, a synthesized signal MUS that is synthesized changing the proportion of the image signal IS and the surrounding image information (unsharp signal) US according to an effect adjustment signal MOD is output, and the visual processing portion 30 outputs a processed signal OS that is obtained by visually processing the image signal IS according to the synthesized signal MUS from the effect adjustment portion 20, but with a visual processing device 3 according to the third embodiment of the invention, an effect adjustment portion 22 creates a profile that is synthesized changing the proportion of the output of each of a plurality of profiles with different visual processing effects in accordance with the effect adjustment signal MOD (hereinafter, this will be called a "synthesized profile"), and sets this in the LUT of the visual processing portion 30. This embodiment is described using FIG. 19.

Figure 19:
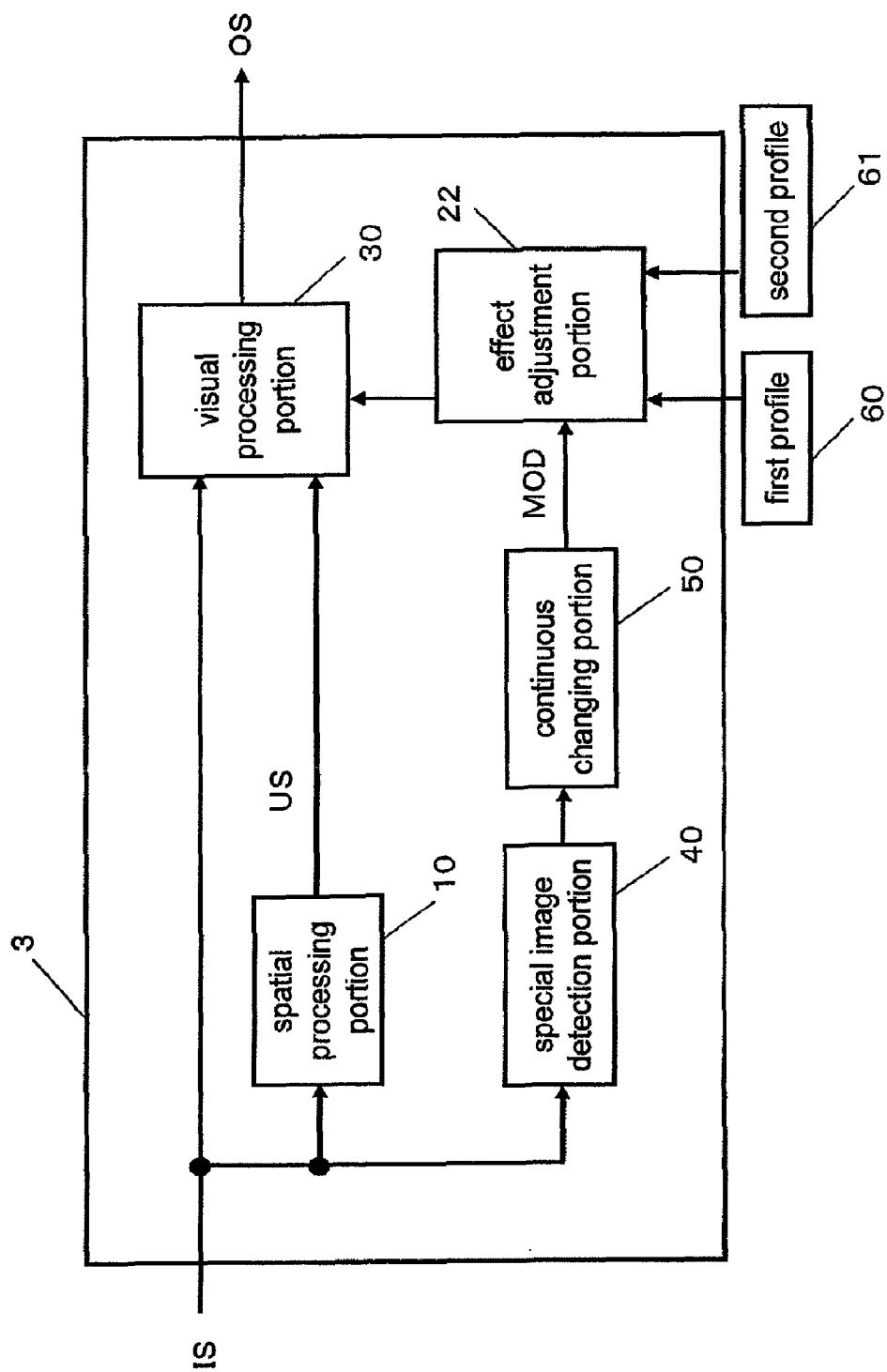
FIG. 19 is a block diagram that shows the configuration of a visual processing device according to a third embodiment of the invention.

FIG. 19 is a block diagram that shows the configuration of a visual processing device 3 according to the third embodiment of the invention. Hereinafter, sections that are identical to those of the first embodiment are assigned the same reference numerals as before and will not be described in detail.

The effect adjustment portion 22 synthesizes a third profile 60 and a fourth profile 61, which have different strengths of visual processing, through an interpolation computation based on the effect adjustment signal MOD in order to create a synthesized profile, and sets this in the LUT of the visual processing portion 30. It should be noted that it is also possible to create the synthesized profile through an extrapolation computation.

The visual processing portion 30 can perform visual processing with different strengths of visual processing and different degrees of visual effects using the synthesized profile that has been set in the LUT.

Thus, according to the visual processing device 3 of the third embodiment of the invention, by synthesizing a plurality of profiles with different visual processing strengths and effects in accordance with the effect adjustment signal MOD and then setting the synthesized profile in the LUT of the visual processing portion 30, it is possible to differ the effect of visual processing.

It should be noted that it is also possible to substitute the special image detection portion 40 for the special image detection portion 70 of the first embodiment of the invention. In this case as well, it is possible to similarly detect special images and then create an effect adjustment signal MOD that corresponds to the bias of information.

It should be noted that it is also possible to substitute the special image detection portion 40 for the special image detection portion 80 of the first embodiment of the invention. In this case as well, it is possible to similarly detect special images and then create an effect adjustment signal MOD that corresponds to the bias of information.

It should be noted that it is also possible to substitute the special image detection portion 40 for the special image detection portion 90 of the first embodiment of the invention. In this case as well, it is possible to similarly detect special images and then create an effect adjustment signal MOD that corresponds to the bias of information.

Fourth Embodiment

Figure 20:
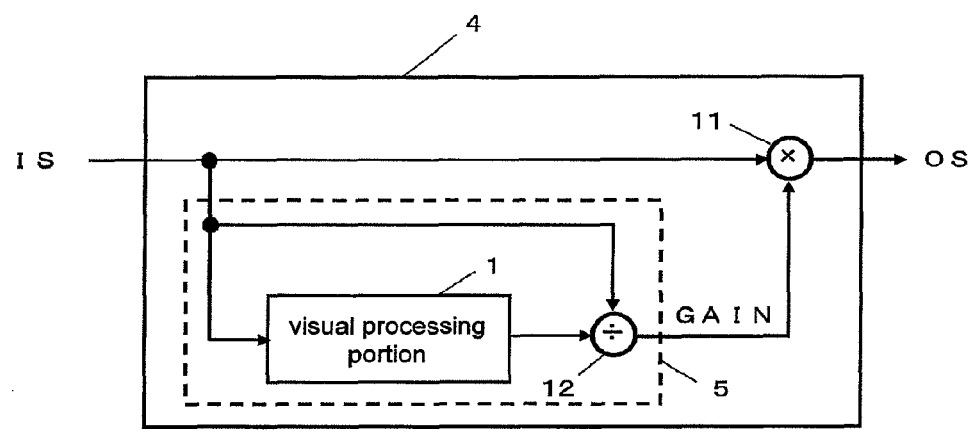
FIG. 20 is a block diagram that shows the configuration of a visual processing system according to a fourth embodiment of the invention.
Figure 21:
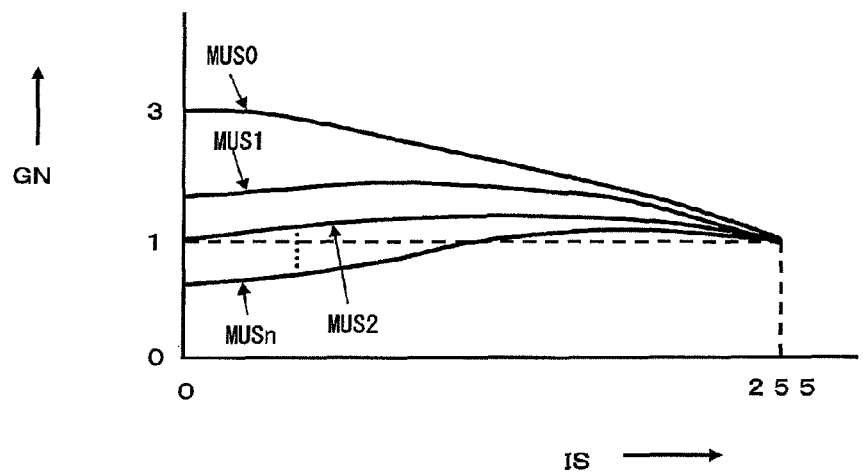
FIG. 21 is an explanatory diagram for describing the two-dimensional gain characteristics of the same.

With the visual processing devices of the first embodiment of the invention through the third embodiment of the invention, a tone conversion value based on two-dimensional tone conversion characteristics is output, but in the fourth embodiment of the invention, a gain-type visual processing system 4 that performs tone conversion using a gain output is described using FIGS. 20 and 21.

FIG. 20 is a block diagram that shows the configuration of a gain-type visual processing system 4 according to the fourth embodiment of the invention, and FIG. 21 is an explanatory diagram for describing the two-dimensional gain characteristics. Hereinafter, sections that are identical to those of the first embodiment are assigned the same reference numerals as before and will not be described in detail.

In FIG. 20, the gain-type visual processing system 4 is provided with a gain-type visual processing device 5 for outputting a gain signal GAIN that is obtained by visually processing the image signal IS, and a multiplier 11 for multiplying the gain signal GAIN and the image signal IS.

The gain-type visual processing device 5 is provided with the visual processing device 1 for outputting a processing signal OS obtained by visually processing the image signal IS, and a divider 12 for dividing the processed signal OS by the image signal IS. Here, the visual processing device 1 outputs a tone conversion value that is obtained by visually processing the output of the image signal IS, and by dividing this tone conversion value by the image signal IS, it is possible to achieve the gain-type visual processing device 5.

The multiplier 11 multiplies the image signal IS and the gain signal GAIN that is output by the gain-type visual processing device 5, and outputs a tone conversion value in which the output of the image signal IS has been visually processed.

It should be noted that it is also possible for the visual processing portion 30 to carry out processing by directly using a profile that has the two-dimensional gain characteristics shown in FIG. 21. Here, the vertical axis of FIG. 21 is the gain output GN, and the horizontal axis is the image signal IS. The two-dimensional gain characteristics shown in FIG. 21 are equivalent to those that are obtained by dividing the output of the profile of the two-dimensional tone conversion characteristics shown in FIG. 2 by the image signal IS. It is also possible to set a profile that has these two-dimensional gain characteristics in the LUT of the visual processing portion 30 of the visual processing device 1. By setting a profile of these two-dimensional gain characteristics in the LUT of the visual processing portion 30 in advance in this way, the gain output GN and the gain signal GAIN become equal and thus the divider 12 can be eliminated and it is still possible to achieve the gain-type visual processing device 5.

With the gain-type visual processing device 5 in the gain-type visual processing system 4 of the fourth embodiment of the invention, there is little change in the processed signal that has been visually processed with respect to the change in the image signal IS that has been input, and thus it is possible to reduce the number of bits of the input signal and also to reduce the circuit scale. Additionally, if the visual processing portion 30 is provided with a 2D LUT, then the memory capacity can be reduced as well.

It should be noted that the visual processing device 2 of the second embodiment of the invention can be substituted for the visual processing device 1 of the first embodiment of the invention. The gain-type visual processing device 5 can be similarly achieved in this case as well.

Likewise, the visual processing device 3 of the third embodiment of the invention can be substituted for the visual processing device 1 of the first embodiment of the invention. The gain-type visual processing device 5 can be similarly achieved in this case as well.

Thus, according to the first embodiment of the invention through the fourth embodiment of the invention, the visual processing effect can be maintained when a normal image that is not a special image has been input, and artifacts can be inhibited when a special image has been input.

Other Embodiments

With the visual processing device and the visual processing system described in the foregoing embodiments of the invention, the special image degree is calculated by calculating the special image degree for all of the pixels of the single image that is formed by the input image signal, or by calculating the special image degree for the pixels that make up a predetermined region of the single image that is formed by the input image signal.

Figure 23:
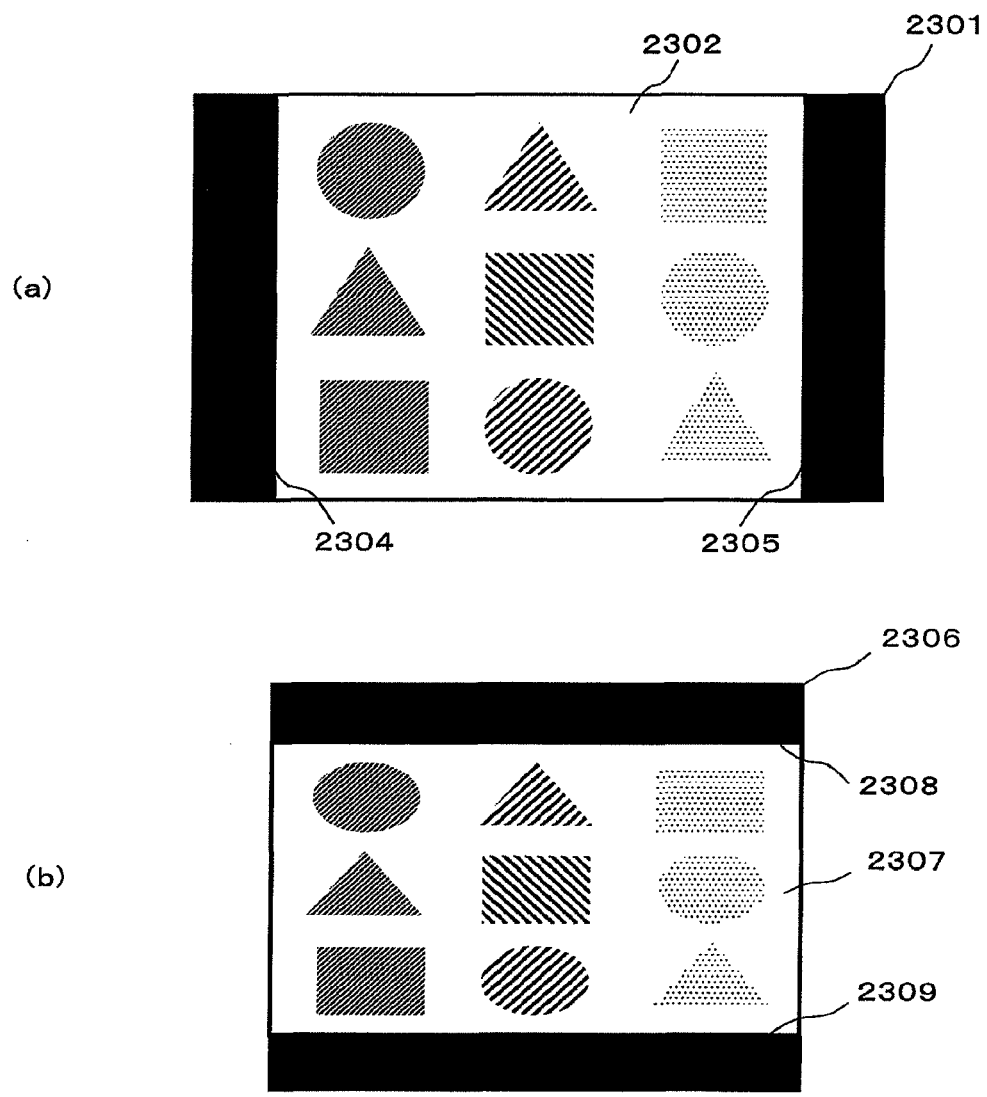
FIG. 23 is an example of a display screen for an image for describing the operation of the visual processing device according to another embodiment of the invention.

For example, as shown in FIG. 23($a$), if an image signal that is obtained by adding black sections 2304 and 2305 to the left and right ends of the image is processed so as to display an image 2302 that has a 4:3 aspect ratio on a display screen 2301 that has a 16:9 aspect ratio, then it is also possible to calculate the special image degree for only the image signals (pixels) that correspond to the image 2302, which has a 4:3 aspect ratio, and exclude the image signals (pixels) that correspond to the black sections 2304 and 2305, and then create the special image effect adjustment signal.

Further, for example, as shown in FIG. 23(b), if an image signal that is obtained by adding black sections 2308 and 2309 to the upper and lower ends of the image is to be processed so as to display an image 2307 that has a 16:9 aspect ratio on a display screen 2306 that has a 4:3 aspect ratio, then it is also possible to calculate the special image degree for only the image signals (pixels) that correspond to the image 2307, which has a 16:9 aspect ratio, and exclude the image signals (pixels) that correspond to the black sections 2308 and 2309, and then create the special image effect adjustment signal.

It should be noted that the foregoing aspect ratios are one example, and of course, the same processing can be performed for other aspect ratios as well. FIGS. 23(a) and 23(b) were simplified drawings for the sake of explanation, and the images that are depicted are not based on a correct aspect ratio.

Figure 24:
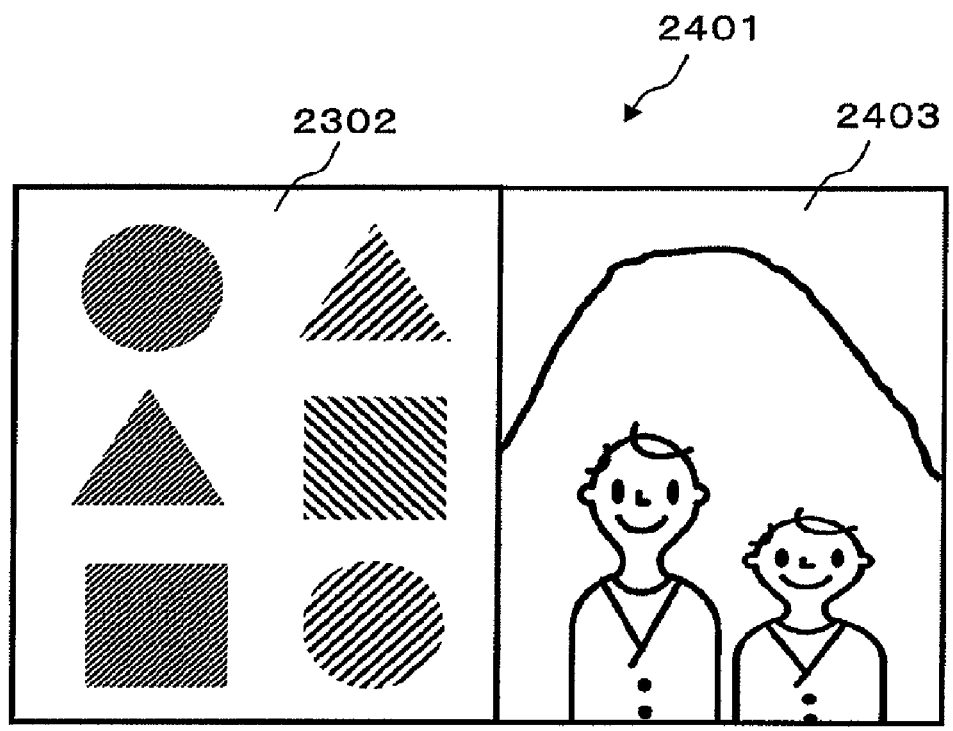
FIG. 24 is an example of a divided display screen for an image for describing the operation of the visual processing device according to another embodiment of the invention.

Further, regarding the image signals in a case where a single display screen displays a plurality of images separately, it is also possible to calculate the special image degree for each separate image that is displayed. For example, as shown in FIG. 24, in the case of an image signal for displaying a special image 2302 in a region on the left side of a display screen 2401 and a general image 2403 in a region on the right side, it is also possible for the special image degree to be calculated based on only the image signal (image pixels) forming the special image 2302 of the region on the left side to create a special image effect adjustment signal, and then for the special image degree to be calculated based on only the image signal (pixels) forming the natural image 2303 of the region on the right side to create a special image effect adjustment signal. In other words, it is possible to calculate the special image degree and create a special image effect adjustment signal in units of images that are displayed separately.

The various functions such as the spatial processing function, effect adjustment function, visual processing function and the like in the visual processing device or visual processing system according to the present invention explained in the aforementioned embodiments may be carried out by hardware using an integrated circuit, or by software that operates using a central processing unit (hereinafter, abbreviated as "CPU"), digital signal processor and the like. Alternatively, they may be carried out by mixed processing using the hardware and software.

When the functions are carried out by the hardware, each function in the embodiments of the present invention may be achieved by a separate integrated circuit, or a part or all of the functions may be achieved by one integrated circuit. The LSI may be referred to as an IC, a system LSI, a super LSI or an ultra LSI in accordance with the degree of integration.

In addition, the integrating circuit may be achieved by an application specific integrated circuit or a versatile processing unit. For example, it is possible to use an FPGA (Field Programmable Gate Array) that is programmable after the LSI is produced or a silicon figurable processor that can restructure connection or setting of circuit cells in the LSI.

Furthermore, if another technique for integrating circuits rather than the LSI appears with the progress of semiconductor technology, then that technique may be utilized for integrating the functional blocks. Biotechnology has the potential for such technology.

Figure 22:
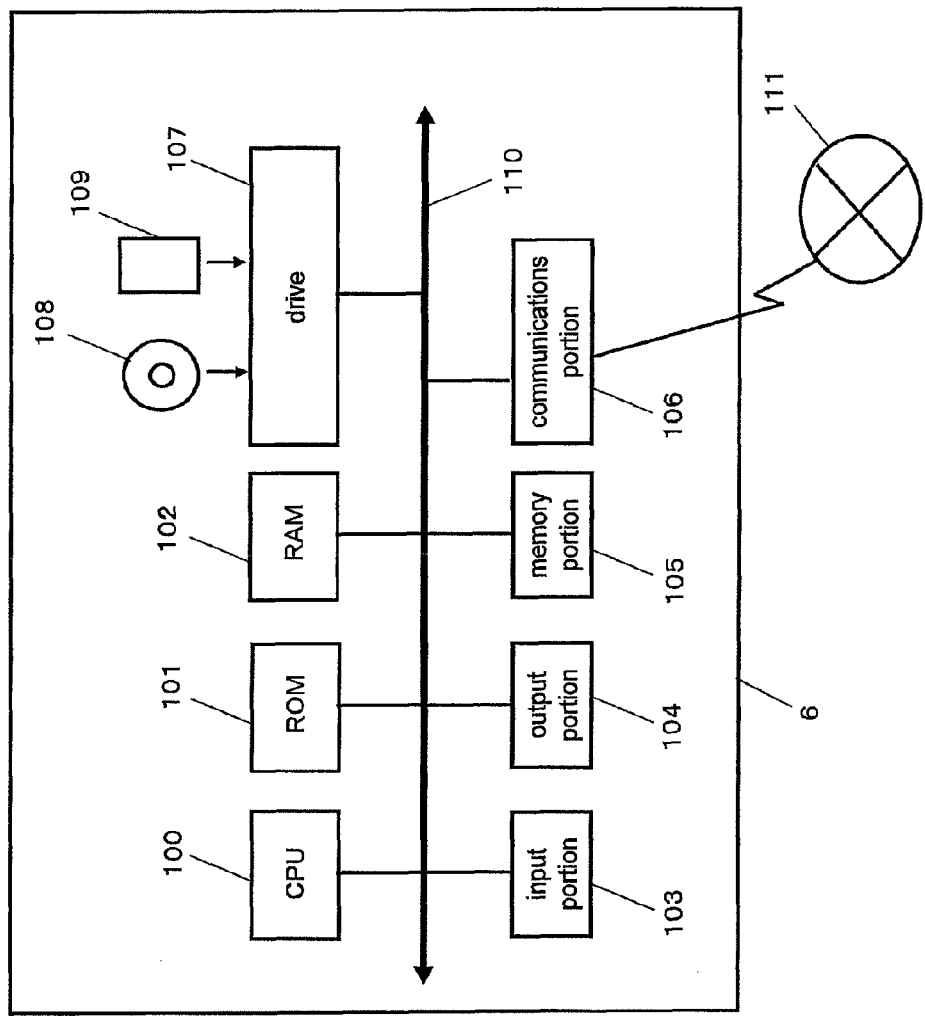
FIG. 22 is a block diagram that describes an example of a computer system according to an embodiment of the invention.

Next, a case in which various functions are executed by software is described using FIG. 22. FIG. 22 is a block diagram showing the configuration of a computer 6 according to an embodiment of the invention.

In FIG. 22, the computer 6 is provided with a CPU 100 that executes the commands of various types of programs, a ROM 101 storing programs, for example, a RAM 102 holding temporarily stored data, an input portion 103 that inputs images, an output portion 104 that outputs images, and a memory portion 105 that stores programs and various types of data.

The computer 6 also can be provided with a communication portion 106 for communicating with the outside, and a drive portion 107 for suitably connecting to information storage media.

The various functional portions send and receive control signals and data, for example, via a bus 110.

The CPU 100 executes various functions according to programs stored on the ROM 101, programs stored on the memory portion 105, and programs stored on the RAM 102.

The ROM 101 stores a visual processing program and characteristic data, for example.

The RAM 102 temporarily stores data that are required for the processing of the various functions by the CPU 100.

The input portion 103 inputs images. For example, it is possible for the input portion 103 to receive electromagnetic waves to obtain broadcast image data, decode the broadcast image data and obtain video signal. It is also possible to obtain digital images directly over a wired connection.

The output portion 104 outputs the images. For example, the output portion 104 outputs to a display device such as a liquid crystal display device or a plasma display. The memory portion 105 is made of a magnetic memory and the like, and stores various programs or data.

The communication portion 106 may be connected to the network 111 and the like, and obtain the program via the network 111, or may install the obtained program in the memory portion 105 as necessary. In this way, the computer 6 can download the program via the communication portion 106.

The drive portion 107 appropriately connects to an information storage medium and obtains information stored therein. The information storage medium may be, for example, the disk 108 such as a magnetic disk, magneto optical disk, optical disk, or the memory card 109 such as a semiconductor memory. In addition, the program having the various functions, characteristic data and the like may be stored in the disk 108 or the memory card 109 such as the semiconductor memory, and the information may be provided to the computer 6.

A program can be incorporated into a computer in advance by dedicated hardware, or it can be provided already incorporated into a ROM 101 or a memory portion 105.

The program can be adopted by devices that handle images, such as information processing devices, televisions, digital cameras, portable telephones, and PDAs. The program can be installed in or connected to a device that handles images, and executes the same visual processing as the visual processing that is achieved by the visual processing devices or visual processing systems described in above embodiments.

It should be noted that if the visual processing device is adopted in a display device, then it is also possible to switch the display mode when a special image is detected.

If the visual processing portion, for instance, of the visual processing devices described in the above embodiments is constituted by a 2D LUT, then the data of the 2D LUT that is referenced are stored in a memory device such as a hard disk or a ROM, and are referenced as necessary. It is also possible for the data of the 2D LUT to be provided from a device for providing the two-dimensional gain data (profile) for the 2D LUT that is directly connected, or is indirectly connected via a network, to the visual processing device.

It should be noted that the specific configuration of the invention is not limited to the foregoing embodiments, and various changes and modifications are possible in a range that does not depart from the gist of the invention.

With the visual processing device, the visual processing method, and the program according to the invention, image signals can be visually processed, and in particular, these are useful as a visual processing device, a visual processing method, and a program that allow artifacts to be suppressed even when a special image has been input.

The invention claimed is:

1. A visual processing device, comprising:
a surrounding image information extraction portion operable to extract, from a pixel group of a pixel area surrounding a target pixel of an input image, surrounding image information including luminance information of the pixel group; and
a visual processing portion including a processor operable to (i) receive a pixel value of the target pixel, (ii) receive the surrounding image information, (iii) obtain a converted pixel value by converting the pixel value of the target pixel, and (iv) output an output image including a group of converted target pixels, such that each target pixel, of the group of converted target pixels, has the converted pixel value,
wherein the visual processing portion enhances a local contrast in a predetermined area included in the input image, and
wherein, when a ratio of part regions of the predetermined area in which a gradation changes when compared to other part regions in the predetermined area is decreasing, or when a ratio of part regions of the predetermined area in which the gradation does not change when compared to other part regions in the predetermined area is increasing, the visual processing portion weakens a degree for enhancing the local contrast in the predetermined area.

2. A display device, comprising:
a data reception portion operable to receive transmitted or broadcast image data;
a decoding portion operable to decode the received image data into video data;
the visual processing device according to claim 1 that performs visual processing with respect to the video data decoded from the received image data and that outputs an output signal obtained from the visual processing; and
a display portion operable to display the output signal obtained from the visual processing.

3. A television device comprising:
a reception portion operable to receive a video signal;
a decoding portion operable to decode the received video signal and output an image signal;
the visual processing device according to claim 1 that performs visual processing with respect to the video signal decoded by the decoding portion and that outputs an output signal; and
a display portion operable to display the output signal.

4. A portable information terminal device comprising:
a reception portion operable to receive a video signal;
a decoding portion operable to decode the received video signal and output an image signal;
the visual processing device according to claim 1 that performs visual processing with respect to the video signal decoded by the decoding portion and that outputs an output signal; and
a display portion operable to display the output signal.

5. A camera comprising:
an imaging portion operable to capture an image and generate an image signal; and
the visual processing device according to claim 1 that performs visual processing with respect to the image signal and that outputs an output signal.

6. A visual processing method, comprising:
extracting, from a pixel group of a pixel area surrounding a target pixel of an input image, surrounding image information including luminance information of the pixel group; and
performing, via a processor, a visual processing by (i) receiving a pixel value of the target pixel, (ii) receiving the surrounding image information, (iii) obtaining a converted pixel value by converting the pixel value of the target pixel, and (iv) outputting an output image including a group of converted target pixels, such that each target pixel, of the group of converted target pixels, has the converted pixel value,
wherein the performing of the visual processing enhances a local contrast in a predetermined area included in the input image, and
wherein, when a ratio of part regions of the predetermined area in which a gradation changes when compared to other part regions in the predetermined area is decreasing, or when a ratio of part regions of the predetermined area in which the gradation does not change when compared to other part regions in the predetermined area is increasing, the performing of the visual processing weakens a degree for enhancing the local contrast in the predetermined area.

7. A non-transitory computer-readable storage medium having a program stored thereon, the program for performing a visual processing, and the program causing a computer to execute a method comprising:
extracting, from a pixel group of a pixel area surrounding a target pixel of an input image, surrounding image information including luminance information of the pixel group; and
performing the visual processing by (i) receiving a pixel value of the target pixel, (ii) receiving the surrounding image information, (iii) obtaining a converted pixel value by converting the pixel value of the target pixel, and (iv) outputting an output image including a group of converted target pixels, such that each target pixel, of the group of converted target pixels, has the converted pixel value,
wherein the performing of the visual processing enhances a local contrast in a predetermined area included in the input image, and
wherein, when a ratio of part regions of the predetermined area in which a gradation changes when compared to other part regions in the predetermined area is decreasing, or when a ratio of part regions of the predetermined area in which the gradation does not change when compared to other part regions in the predetermined area is increasing, the performing of the visual processing weakens a degree for enhancing the local contrast in the predetermined area.

8. An integrated circuit, comprising:
a surrounding image information extraction portion operable to extract, from a pixel group of a pixel area surrounding a target pixel of an input image, surrounding image information including luminance information of the pixel group; and a visual processing portion operable to (i) receive a pixel value of the target pixel, (ii) receive the surrounding image information, (iii) obtain a converted pixel value by converting the pixel value of the target pixel, and (iv) output an output image including a group of converted target pixels, such that each target pixel, of the group of converted target pixels, has the converted pixel value, wherein the visual processing portion enhances a local contrast in a predetermined area included in the input image, and wherein, when a ratio of part regions of the predetermined area in which a gradation changes when compared to other part regions in the predetermined area is decreasing, or when a ratio of part regions of the predetermined area in which the gradation does not change when compared to other part regions in the predetermined area is increasing, the visual processing portion weakens a degree for enhancing the local contrast in the predetermined area.

\* \* \* \* \*